(12) United States Patent
Sarbaev et al.

(10) Patent No.: US 8,606,722 B2
(45) Date of Patent: *Dec. 10, 2013

(54) SYSTEM, METHOD, AND COMPUTER PROGRAM PRODUCT FOR PROVIDING AN ASSOCIATION BETWEEN A FIRST PARTICIPANT AND A SECOND PARTICIPANT IN A SOCIAL NETWORK

(71) Applicant: Your Net Works, Inc., San Francisco, CA (US)

(72) Inventors: Miro Sarbaev, San Francisco, CA (US); Olga Beregovaya, San Francisco, CA (US); Alex Lerner, San Francisco, CA (US); Anya Nikulina, San Francisco, CA (US)

(73) Assignee: Your Net Works, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/917,592

(22) Filed: Jun. 13, 2013

(65) Prior Publication Data

US 2013/0282823 A1    Oct. 24, 2013

Related U.S. Application Data

(63) Continuation of application No. 13/791,775, filed on Mar. 8, 2013, which is a continuation of application No. 13/530,007, filed on Jun. 21, 2012, now Pat. No. 8,417,645, which is a continuation of application No. 13/303,070, filed on Nov. 22, 2011, now abandoned, which is a continuation of application No. 12/372,584, filed on Feb. 17, 2009, now Pat. No. 8,090,666.

(60) Provisional application No. 61/029,267, filed on Feb. 15, 2008.

(51) Int. Cl.
*G06Q 99/00* (2006.01)
*G06F 15/16* (2006.01)

(52) U.S. Cl.
USPC .................. 705/319; 709/204; 709/218

(58) Field of Classification Search
None
See application file for complete search history.

(56) References Cited

U.S. PATENT DOCUMENTS

| | | | |
|---|---|---|---|
| 7,117,254 B2* | 10/2006 | Lunt et al. ............... | 709/218 |
| 7,143,091 B2 | 11/2006 | Charnock et al. | |
| 7,539,697 B1 | 5/2009 | Akella et al. | |
| 8,010,418 B1 | 8/2011 | Lee | |
| 2002/0080167 A1 | 6/2002 | Andrews et al. | |
| 2002/0194256 A1 | 12/2002 | Needham et al. | |
| 2004/0102186 A1 | 5/2004 | Odinak | |
| 2004/0198398 A1 | 10/2004 | Amir et al. | |
| 2004/0215793 A1 | 10/2004 | Ryan et al. | |
| 2004/0221309 A1 | 11/2004 | Zaner et al. | |
| 2005/0015432 A1 | 1/2005 | Cohen | |
| 2005/0021531 A1 | 1/2005 | Wen et al. | |

(Continued)

FOREIGN PATENT DOCUMENTS

EP    1847951 A1    10/2007

*Primary Examiner* — Fahd Obeid
(74) *Attorney, Agent, or Firm* — Zilka-Kotab, PC

(57) ABSTRACT

A system, method, and computer program product are provided for associating a first participant and a second participant in a social network. In one embodiment, payment is received from a first participant. Additionally, an association between the first participant and a second participant in a social network is provided, in exchange for the payment.

27 Claims, 18 Drawing Sheets

(56) References Cited

U.S. PATENT DOCUMENTS

| | | |
|---|---|---|
| 2005/0060287 A1 | 3/2005 | Hellman |
| 2005/0159970 A1 | 7/2005 | Buyukkokten et al. |
| 2005/0182745 A1 | 8/2005 | Dhillon et al. |
| 2005/0246420 A1 | 11/2005 | Little |
| 2006/0020593 A1 | 1/2006 | Ramsaier et al. |
| 2006/0042483 A1 | 3/2006 | Work et al. |
| 2006/0085373 A1 | 4/2006 | Dhillion et al. |
| 2006/0100892 A1 | 5/2006 | Ellanti |
| 2006/0123127 A1 | 6/2006 | Littlefield |
| 2006/0129551 A1 | 6/2006 | Teicher |
| 2006/0132826 A1 | 6/2006 | Ciriza et al. |
| 2006/0143081 A1 | 6/2006 | Argaiz |
| 2006/0143214 A1 | 6/2006 | Teicher |
| 2006/0165040 A1 | 7/2006 | Rathod et al. |
| 2006/0173838 A1 | 8/2006 | Garg et al. |
| 2006/0173957 A1 | 8/2006 | Robinson et al. |
| 2006/0173963 A1 | 8/2006 | Roseway et al. |
| 2006/0230137 A1 | 10/2006 | Gare et al. |
| 2006/0248573 A1 | 11/2006 | Pannu et al. |
| 2006/0271564 A1 | 11/2006 | Meng Muntz et al. |
| 2006/0271620 A1 | 11/2006 | Beaty et al. |
| 2006/0287876 A1 | 12/2006 | Jedlicka |
| 2007/0067271 A1* | 3/2007 | Lu .................................... 707/3 |
| 2007/0106780 A1 | 5/2007 | Farnham et al. |
| 2007/0136178 A1 | 6/2007 | Wiseman et al. |
| 2007/0143128 A1 | 6/2007 | Tokarev et al. |
| 2007/0180078 A1 | 8/2007 | Murphy et al. |
| 2007/0208727 A1 | 9/2007 | Saklikar et al. |
| 2007/0209069 A1 | 9/2007 | Saklikar et al. |
| 2007/0214264 A1 | 9/2007 | Koister |
| 2007/0239677 A1 | 10/2007 | Zhao et al. |
| 2007/0271234 A1 | 11/2007 | Ravikiran |
| 2008/0134294 A1* | 6/2008 | Mattox et al. .................... 726/4 |
| 2010/0107219 A1 | 4/2010 | Thompson et al. |

* cited by examiner

SYSTEM, METHOD, AND COMPUTER PROGRAM PRODUCT FOR PROVIDING AN ASSOCIATION BETWEEN A FIRST PARTICIPANT AND A SECOND PARTICIPANT IN A SOCIAL NETWORK

RELATED APPLICATION(S)

The present application is a continuation of U.S. application Ser. No. 13/791,775, filed Mar. 8, 2013, which is a continuation of U.S. application Ser. No. 13/530,007, filed Jun. 21, 2012, now U.S. Pat. No. 8,417,645, which is a continuation of U.S. application Ser. No. 13/303,070, filed Nov. 22, 2011, which is a continuation of U.S. application Ser. No. 12/372,584, filed Feb. 17, 2009, now U.S. Pat. No. 8,090,666, which claims the benefit of U.S. Provisional Application No. 61/029,267, filed on Feb. 15, 2008, all of which are incorporated herein by reference in their entirety and for all purposes.

FIELD OF THE INVENTION

The present invention relates to social networks, and more particularly to participants of social networks.

BACKGROUND

Traditionally, social networks are provided to participants (e.g. users, entities, etc.) for allowing the participants to interact (e.g. socialize, etc.) via a network. Oftentimes, the interaction includes sending and receiving electronic messages, exchanging content, etc. Unfortunately, the functionality of traditional social networks that is available to participants has generally been limited.

There is thus a need for addressing these and/or other issues associated with the prior art.

SUMMARY

A system, method, and computer program product are provided for associating a first participant and a second participant in a social network. In one embodiment, payment is received from a first participant. Additionally, an association between the first participant and a second participant in a social network is provided, in exchange for the payment.

In another embodiment, a follower is added. Further, it is determined whether a threshold has been reached, based on the addition of the follower. Still yet, additional network use options are presented to a content provider, based on the determination.

In yet another embodiment, a participant is joined to a lowest circle of followers associated with a content provider, based on an initiative of the participant. In addition, the participant is allowed to indicate a desire to join a higher circle of followers associated with the content provider. Moreover, it is determined whether an invite has been sent from the content provider to the participant, and it is determined whether the invite has been accepted by the participant, if the invite has been sent from the content provider to the participant. Furthermore, the participant is elevated to the higher circle of followers associated with the content provider, if the invite has been accepted by the participant.

In still yet another embodiment, a social hierarchy is graphically represented utilizing a plurality of concentric circles. Further, each concentric circle includes followers or friends of different level of closeness to a participant.

In another embodiment, a request to display content is received by the network from a participant. Additionally, a language preference of the participant is identified. Furthermore, it is determined whether the content is available in a first language preference of the participant. If it is determined that the content is available in the first language, the content is displayed to the participant in the first language. However, if it is determined that the content is not available in the first language, it is determined whether the content is available in a second language associated with the participant. If it is determined that the content is available in the second language, the content is displayed to the participant in the second language. If it is determined that the content is not available in the second language, the content is displayed to the participant in a default language.

BRIEF DESCRIPTION OF THE DRAWINGS

FIG. 9 shows a GUI presenting a main web page associated with a participant, in accordance with still yet another embodiment.

FIG. 15 shows a GUI for modifying settings for paid circles of a participant, in accordance with another embodiment.

DETAILED DESCRIPTION

Figure 1:
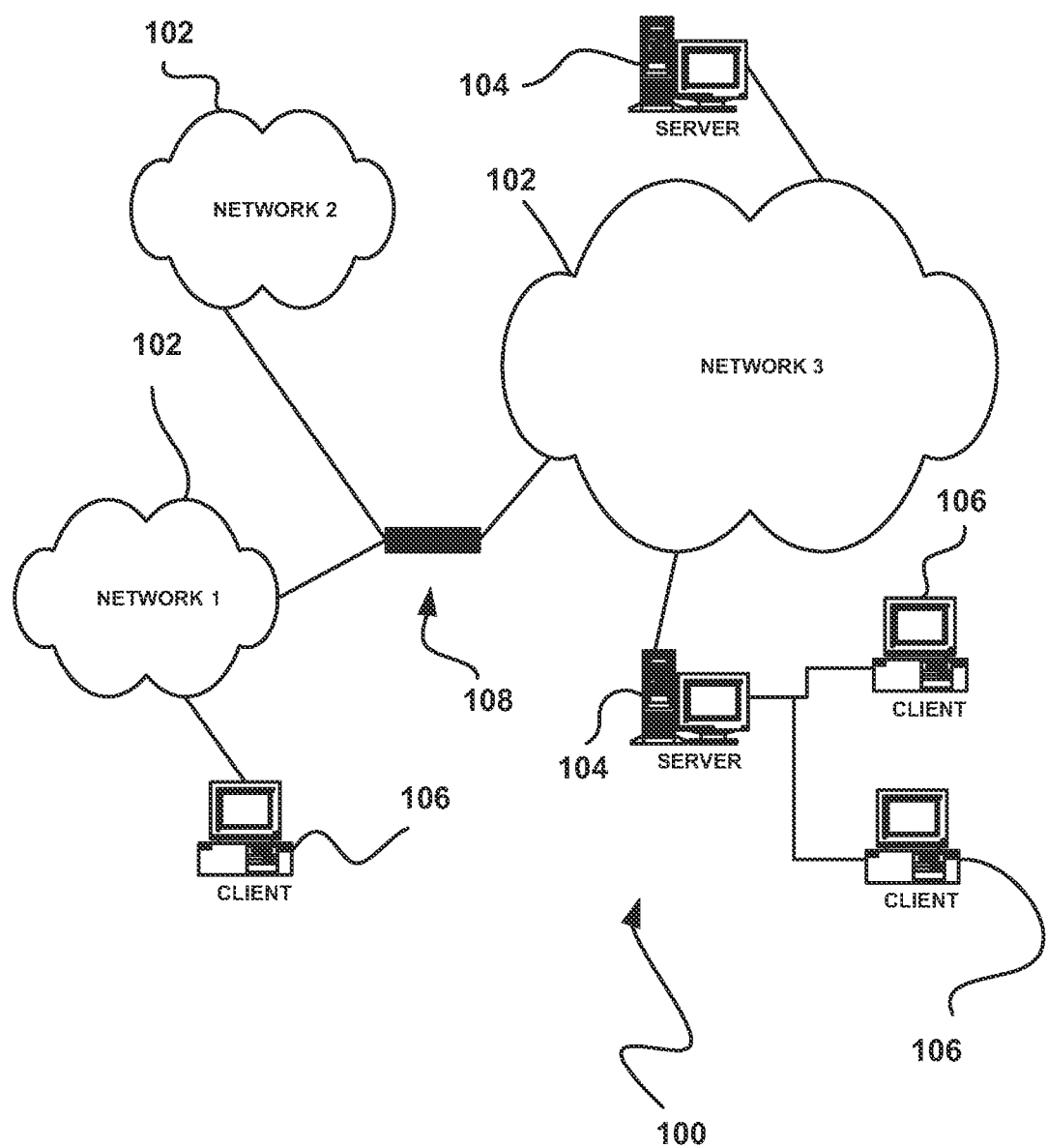
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
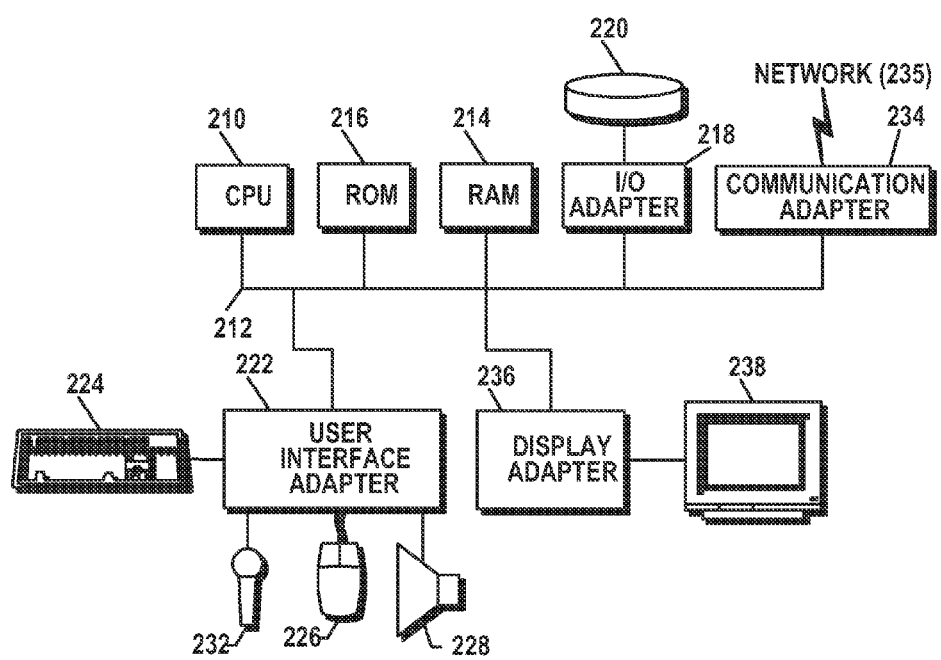
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
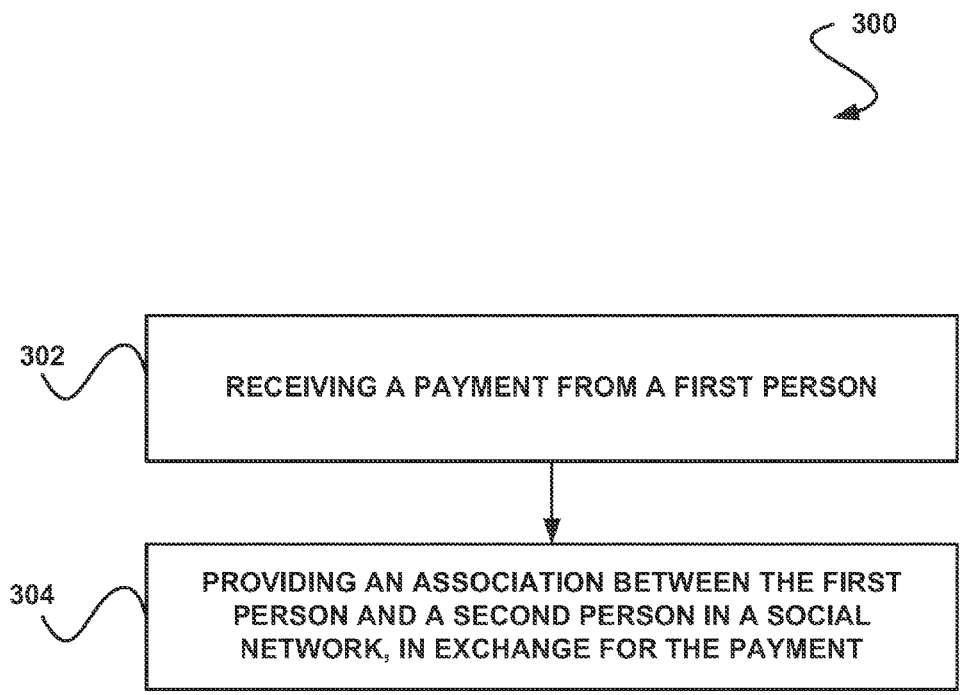
FIG. 3 shows a method for providing an association between a first participant and a second participant in a social network, in accordance with one embodiment.

FIG. 3 shows a method 300 for providing an association between a first participant and a second participant in a social network, in accordance with one embodiment. As an option, the method 300 may be carried out in the context of the architecture and environment of FIGS. 1 and/or 2. Of course, however, the method 300 may be carried out in any desired environment.

As shown in operation 302, a payment is received from a first participant. In the context of the present description, the first participant may include any person or entity (e.g. group of persons) from which payment may be received. For example, the first participant may include a user (e.g. member, etc.) of a service via which the payment is received.

In one embodiment, the first participant may include a user of a social network. For example, the first participant may subscribe to the social network. In the context of the present description, such social network may include any network capable of being utilized by people for social networking purposes. Optionally, the social network may be accessibly by the first participant via a website representative of the social network.

In another embodiment, the first participant may include a user of a device. Optionally, the device may include any of the devices described above with respect to FIGS. 1 and/or 2. To this end, the first participant may utilize the device for sending the payment.

Additionally, the payment may include any desired type of compensation. In one embodiment, the payment may include a transfer of money (e.g. via a credit account, a debit account, etc.). In another embodiment, the payment may include a subscription payment. For example, the subscription payment may include one payment in a series of payments associated with a subscription. In yet another embodiment, the payment may be received by a provider of the service (e.g. the social network, etc.). As an option, the payment may be sent by the first participant and/or received (e.g. by the service provider, etc.) via the website representative of the social network.

Furthermore, as shown in operation 304, an association between the first participant and a second participant is provided in the social network, in exchange for the payment. In this way, the payment may optionally be received from the first participant for establishing the association between the first participant and the second participant. Of course, in the context of a subscription payment, the payment may be received from the first participant for maintaining a subscription providing an association between the first participant and the second participant, as an option. In the context of the present description, the second participant may include any participant that is different from the first participant for which an association with the first participant may be provided.

In one embodiment, the second participant may include a user (e.g. subscriber, etc.) of the service (e.g. the social network, etc.). For example, the second participant may include a content provider associated with the social network. Thus, the second participant may provide content (e.g. images, video, text, music, source code, computer programs, etc.) via the social network. It should be noted that, as an option, the second participant may include a plurality of persons identified as a single entity (e.g. a single account of the service, etc.) or a project, capable of being managed by several users of the service.

In another embodiment, the second participant may include a user of a device. For example, the second participant may utilize the device to access the social network. As another example, the second participant may utilize the device to upload the content to the social network (e.g. via the website representative of the service). Moreover, the second participant may receive the payment from the first person (e.g. via the service provider, etc.).

Still yet, the association between the first participant and the second participant may include any desired type of relationship provided in the social network, in the context of the present description. For example, the social network may establish the association between the first participant and the second participant. Such association may further be indicated via the social network (e.g. via the website representative of the social network, etc.).

In one embodiment, the association between the first participant and the second participant may include adding the first participant to a circle (e.g. group, etc.) of followers associated with the second participant. Such followers may include participant of the social network with an association to the second participant. Optionally, the second participant may be associated with a plurality of different circles of followers.

Each of such different circles of followers may include different access rights associated with content provided by the second participant, for example. As another example, each of such different circles of followers may provide different opportunities (e.g. promotions, interaction with the second person, tools, etc.) to the followers included in an associated circle. To this end, the first participant may be added to one of the circles of followers in exchange for the payment (e.g. subscription payment, etc.).

As an option, each of the different circles of followers may be associated with a different level. Accordingly, a circle of followers associated with a higher level may be provided with more access rights, opportunities, etc. than a circle of followers associated with a lower level. Further, only a subset (e.g. one, etc.) of the circles of followers associated with the second participant may require the payment from the first participant in exchange for associating the first participant with such circle. In this way, the first participant may optionally be added to the circle of followers requiring the payment, in exchange for the payment from the first participant.

In yet another embodiment, the association between the first participant and the second participant may include adding the first participant to a list of followers associated with the second participant. Such second participant may utilize the list of followers for contacting the followers in the list, for example.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4A:
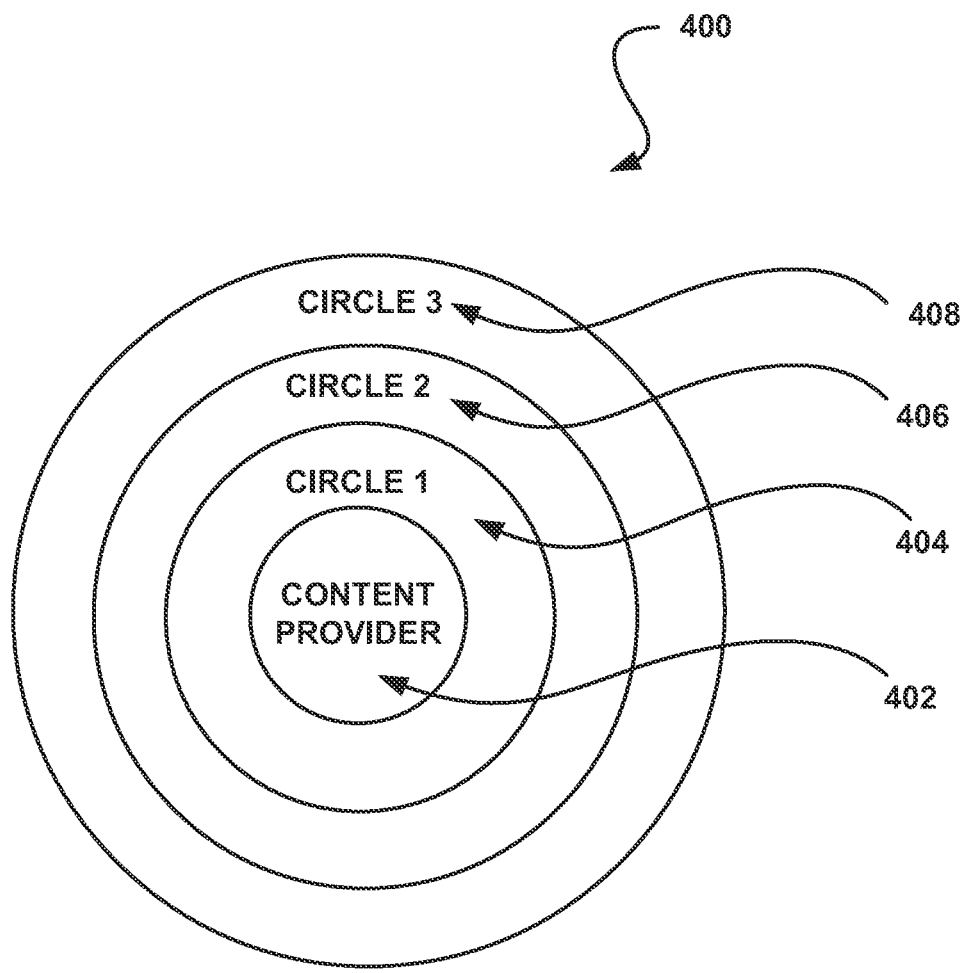
FIG. 4A shows a system for providing an association between a first participant and a second participant in a social network, in accordance with another embodiment.

FIG. 4A shows a system 400 for providing an association between a first participant and a second participant in a social network, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a content provider 402 is associated with a plurality of circles of followers 402-408. In the context of the present embodiment, the content provider may include any participant (e.g. person or group of persons acting as a single entity) providing content via a social network. Just by way of example, the content provider may be a subscriber of the social network, and thus may have an account associated with the social network. Thus, the content provider may optionally provide content via the social network account.

Additionally, the circles of followers 404-408 may each include various participants (e.g. subscribers, etc.) of the social network with an association to the content provider 402. For example, each of the participants may be associated with the content provider 402, and thus included in one of the circles of followers 404-408 associated with the content provider, optionally in exchange for a payment. Of course, as another example, each of the participants may be associated with the content provider 402 based on a request received from such participant to be added to one of such circles of followers 404-408, or based on an invitation from the content provider 402.

Optionally, each of the circles of followers 404-408 may be associated with the same or different threshold number of followers. Thus, the number of followers included in each of the circles of followers 404-408 may be prevented from exceeding the associated threshold.

As also shown, the circles of followers 404-408 may be hierarchical. For example, a first circle of followers 404 may be associated with a higher level in the hierarchy than a second circle of followers 406, and so forth. To this end, each of the circles of followers 404-408 may optionally indicate a different type of association between the content provider 402 and the followers included in such circle of followers 404-408. Optionally, each of the circles of followers 404-408, including criteria for entry into such circles of followers 404-408 by followers (e.g. various payment amounts, etc.), a name of each of the circles of followers 404-408, etc. may be configured by the content provider 402.

Just by way of example, the first circle of followers 404 may be provided greater access rights to content (e.g. access to more content, etc.) and/or opportunities provided by the content provider 402 than the second circle of followers 404, the second circle of followers 404 may be provided greater access rights to content and/or opportunities provided by the content provider 402 than the third circle of followers 408, etc.

In one exemplary embodiment, the content provider 402 may include a musician (or a group of musicians included in a band, etc.). Thus, followers of the first circle 404 may have access to content provided by such musician (e.g. concert tickets, promotions, music, announcements, etc.) that is inaccessible by followers of the second circle 406 or third circle 408. Similarly, followers of the second circle 406 may have access to content provided by the musician that is inaccessible by followers of the third circle 408.

In one embodiment, the most outer circle of followers 408 (e.g. the third circle of followers 408 in the present system 400) may include a default circle to which followers newly associated with the content provider 402 are added. For example, followers may be added to the most outer circle of followers 408 in response to a request from such followers to be associated with the content provider 402. As an option, the request may be received by the content provider 402 (e.g. as a message, etc.) via a website representative of the social network. To this end, the most outer circle of followers 408 may be automatically associated with the content provider 402.

However, the second circle of followers 406 may only be associated with the content provider 402 after a predefined thresholds of followers have been added to the most outer circle 408, and the first circle of followers 404 may only be associated with the content provider 402 after a predefined thresholds of followers have been added to the second circle of followers 406, as an option.

In another embodiment, followers may be moved from the lowest circle of followers to any of the higher circles of followers (e.g. the second circle of followers 406 or the first circle of followers 404 in the present system 400). Just by way of example, the followers in a lower circle may be invited to be added to a higher circle of followers manually. Optionally, the content provider 402 may invite a follower included in a lower circle to a particular higher circle, such that acceptance of the invitation by the follower moves the follower to such higher circle. As another option, the content provider 402 may select one of the followers via the website for issuing the invitation to such follower.

As another example, the followers in a lower circle may be invited to be added to a higher circle of followers automatically (e.g. by meeting criteria associated with such higher circle of followers, etc.). In one embodiment, the invitation may be automatically communicated to a follower in exchange for payment received from the follower. In another embodiment, the invitation may be automatically communicated to a follower based on activity of each of the followers with respect to content provided by the content provider 402, such as a follower accessing a predefined amount of content, providing feedback on content, providing a translation of the content from first language to a second language, etc. Information (e.g. statistics, reports, etc.) associated with such follower activity may also be provided to the content provider 402.

Furthermore, the musician may indicate criteria for entry into the second circle of followers 406 and the first circle of followers 408. Just by way of example, the musician may indicate that the followers in the third circle 408 may be moved to the second circle of followers 406 after such followers have been in the third circle 408 for a predetermined amount of time. Further, the musician may indicate that the followers in the second circle 406, and optionally the third circle 408, may be moved to the first circle of followers 404 in exchange for a predetermined payment from such followers, after reaching a certain level of activity interacting with the musician or other members of the musician's circle, etc. Any payment from one of the followers may be directly transmitted from such follower to the musician, as an option.

In another exemplary embodiment, the content provider 402 may include a plurality of developers on an open source development team. Each of the developers may optionally have equal access rights to manage an account utilized for social networking. As an option, one of the developers may create the account and invite the other developers to be a part of the open source development team.

Accordingly, each of the circles of followers 404-408 associated with the open source development team may be associated with different access rights to source code (e.g. for an application being developed, etc.) provided by such open source development team. For example, the open source development team may configure the third circle of followers 408 to include early adopters of the source code, the second circle 406 to include followers allowed to develop drivers for the source code, and the first circle 404 to include followers allowed to develop any portion of the source code. As another example, the third circle 408 may be marked as paid (e.g. followers of such third circle 408 may be required to pay for entry into the third circle 408), and funds raised from the third circle 408 may be used to fund further source code development.

As an option, each of the circles of followers 404-408 may be concentric. Further, the circles of followers 404-408 may be utilized to graphically represent a social hierarchy. For example, the social hierarchy may include a hierarchy of followers or friends of different level of closeness to the content provider 402.

Figure 4B:
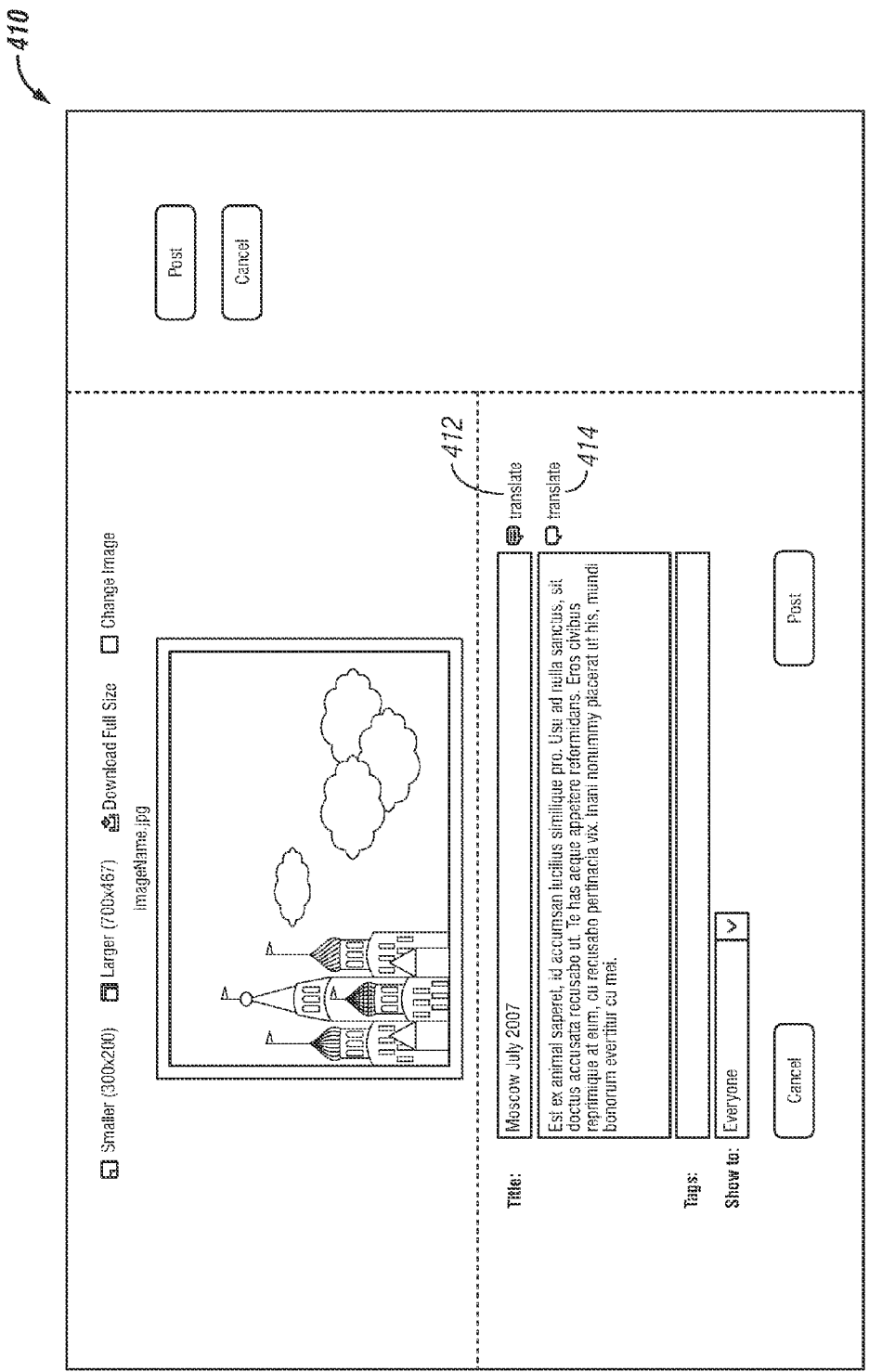
FIG. 4B shows a graphical user interface for translating content into a language different from a default language used by a content provider, in accordance with another embodiment.
Figure 4C:
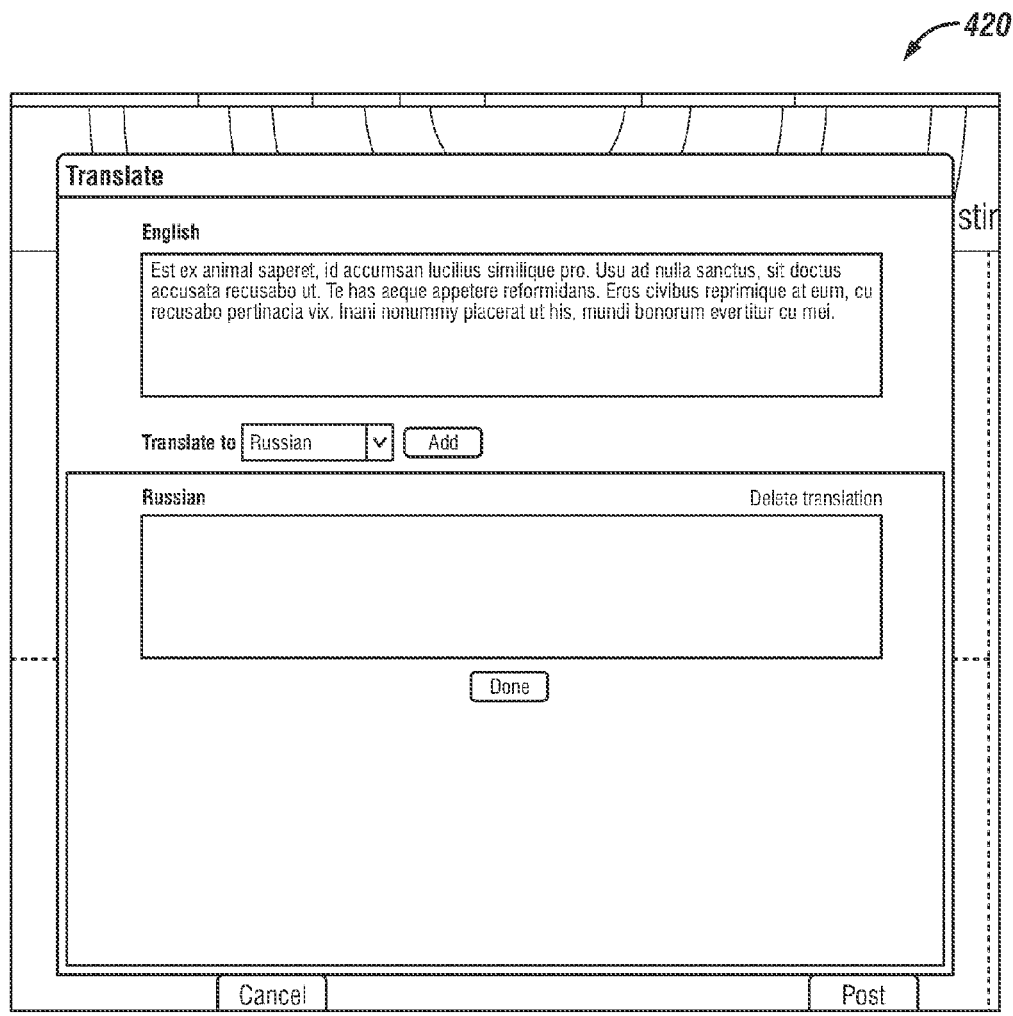
FIG. 4C shows a graphical user interface for entering a translation for a text, in accordance with another embodiment.

As another option, content accessible to the followers of the content provider 402 may be displayed in one of a plurality of available languages. For example, in response to posting content by the content provider 402 for presentation to the followers, the content provider 402 may choose or may be prompted to translate the content into a language different from the default language used by the content provider 402 in creating the content (e.g. as illustrated in the graphical user interface (GUI) 410 of FIG. 4B). As an option, the content provider 402 may only receive the prompt (e.g. items 412 and 414 of FIG. 4B) if an interface language of the content provider 402 is changed. Further, the prompt may include requesting the content provider 402 to translate the content into a language associated with the interface language of the content provider 402. In this way, the content provider 402 may provide the content in a plurality of different languages. FIG. 4C illustrates one example of a GUI 420 for entering a translation for a text.

Further, upon receipt of a request by one of the followers to view (or otherwise receive in any manner) the content (e.g. for the content to be displayed over a network), an interface language of such follower (e.g. a preferred interface language set by the participant) may be identified. It may be determined whether the content requested by the follower is available (e.g. has been provided by the content provider 402) in a language associated with the language of the user interface (the interface language) of the follower. If it is determined that the content is available in such language, the content may be displayed to the follower in this language.

If, however, it is determined that the content is not available in the language of the user interface, it may be determined whether the content is available in any language associated with the follower, which may include a language input by the follower, another language associated with the user interface of the follower, etc. If it is determined that the content is available in such language, the content may be displayed to the follower in this language. On the other hand, if it is determined that the content is not available in such language, the content may be displayed to the follower in the default language used by the content provider 402 in creating the content. Of course, however, it may be determined whether the content is available in any different language associated with the follower.

Figure 5:
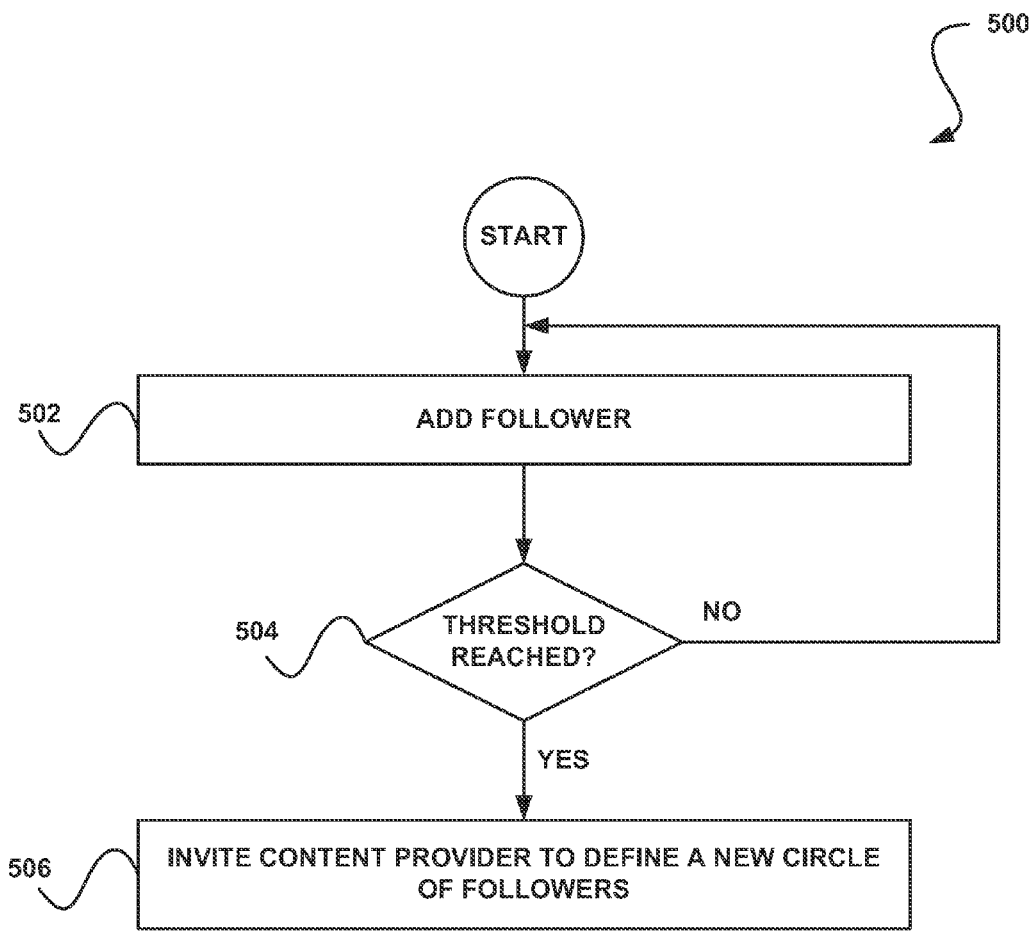
FIG. 5 shows a method for inviting a content provider to define a circle of followers, in accordance with yet another embodiment.

FIG. 5 shows a method 500 for inviting a content provider to define a circle of followers, in accordance with yet another embodiment. As an option, the method 500 may be carried out in the context of the architecture and environment of FIGS. 1-4. Of course, however, the method 500 may be carried out in any desired environment. Again, it should be noted that the aforementioned definitions may apply during the present description.

As shown in operation 502, a follower is added. In the context of the present embodiment, the follower may include any participant of a social network to which an association with a content provider is added. Thus, adding the follower may optionally include associating the follower with the content provider.

In one embodiment, the follower may be added to a circle of followers associated with the content provider. Such circle of followers may be associated with a lowest level (e.g. among a plurality of circles of followers associated with the content provider), as an option. As another option, the circle of followers may include a default circle of followers associated with the content provider upon creation of a social networking account by the content provider.

In another embodiment, the follower may be added to the circle of followers in response to a request from the follower to be added to the circle of followers. In yet another embodiment, the follower may be added to the circle of followers in exchange for payment received from the follower. Of course, however, the follower may be added to the circle of followers after meeting any criteria associated with such circle that is predefined (e.g. by the content provider, by default, etc.).

Additionally, it is determined whether a threshold is reached, as shown in decision 504. With respect to the present embodiment, the threshold may include a threshold number of followers associated with the content provider. For example, the threshold may be applied to a number of followers included in a circle of followers to which the follower was added (in operation 502).

Further, the threshold may be predefined (e.g. by the social network provider). In one embodiment, the threshold may be based on the particular circle of followers to which it is applied. In this way, different circles of followers associated with the content provider may be associated with different thresholds.

If it is determined that the threshold has not been reached, no change occurs. When a next follower is added (operation 502), the threshold evaluation (decision 504) is repeated. If it is determined that the threshold has been reached, the content provider is invited to define a new circle of followers. Note operation 506. In one embodiment, the new circle of followers may include a second circle of followers associated with a higher level than the circle of followers to which the follower was added (in operation 502). Of course, in another embodiment, the new circle of followers may include a second circle of followers associated with a lower level than the circle of followers to which the follower was added (in operation 502).

The invitation may be sent to the content provider in the form of a message, as an option. As another option, the invitation may be sent to the content provider in the form of a prompt. Moreover, the invitation may be sent to the content provider via the social networking account (e.g. webpage, etc.) of the content provider. Thus, the content provider may optionally define the new circle of followers utilizing a graphical user interface (GUI) providing via the social networking account.

Still yet, defining the new circle of followers may include providing a name for the new circle of followers, in one embodiment. In another embodiment, defining the new circle of followers may include providing criteria (e.g. payment amount, etc.) for entry by a follower into such new circle of followers. In yet another embodiment, defining the new circle of followers may include indicating access rights and/or opportunities provided to followers included in such new circle of followers.

In still yet another embodiment, the new circle of followers may be defined by inviting followers to the new circle of followers. For example, the invited followers may include followers of the circle to which the follower was added in operation 502, followers not included in any circle associated with the content provider, etc. Of course, however, the new circle of followers may be defined in any desired manner.

Figure 15:
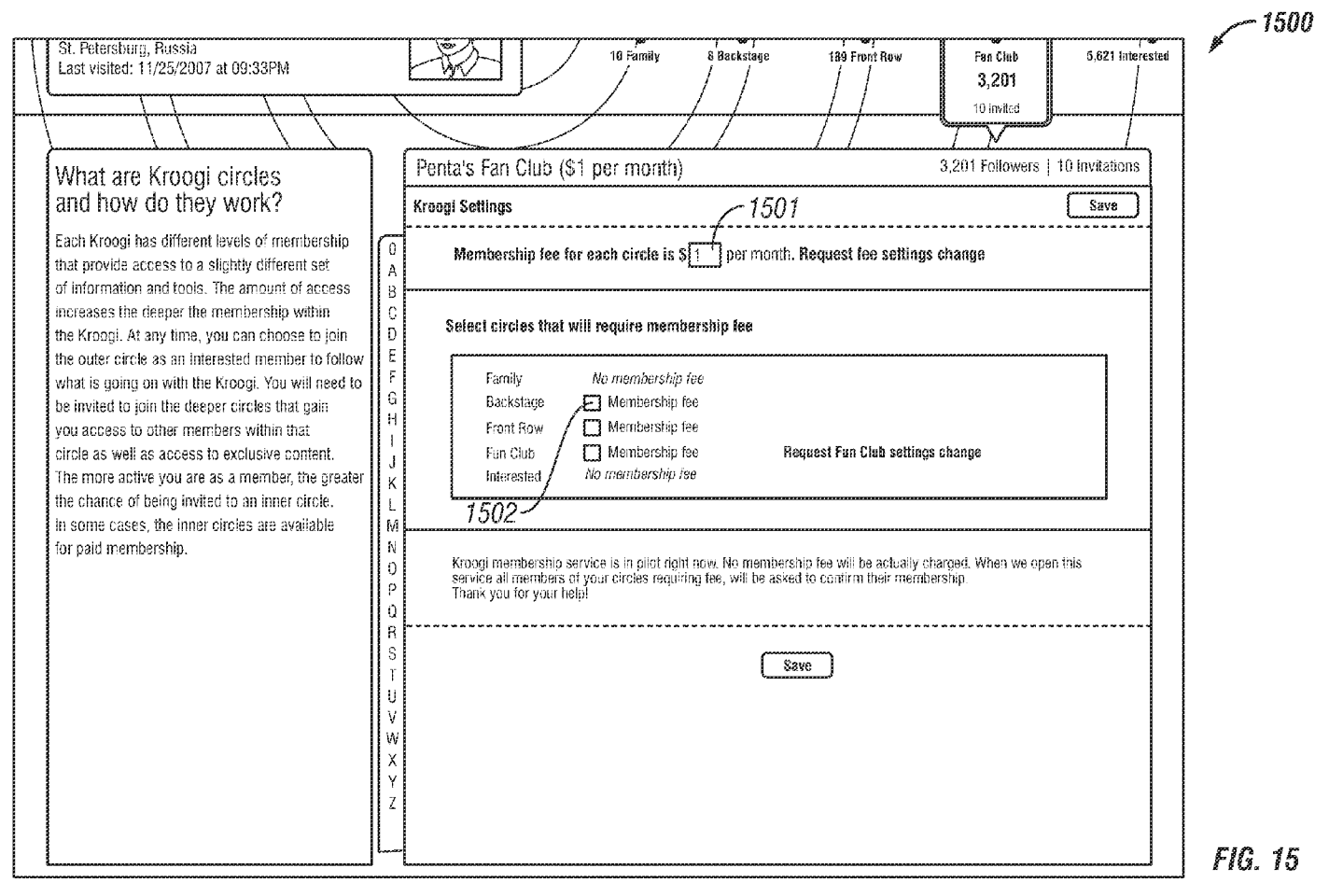

It should also be noted that, as another option, in response to the determination that the threshold has been reached, any type of additional network use options may be presented to the content provider. For example, the additional network use options may include inviting the content provider to define a new circle of followers (as described above with respect to operation 506). As another example, the additional network use options may include allowing the content provider to designate a circle of followers as being associated with a fee (e.g. as shown in FIG. 15), such that followers may only be included in such circle upon payment of the fee.

Figure 6:
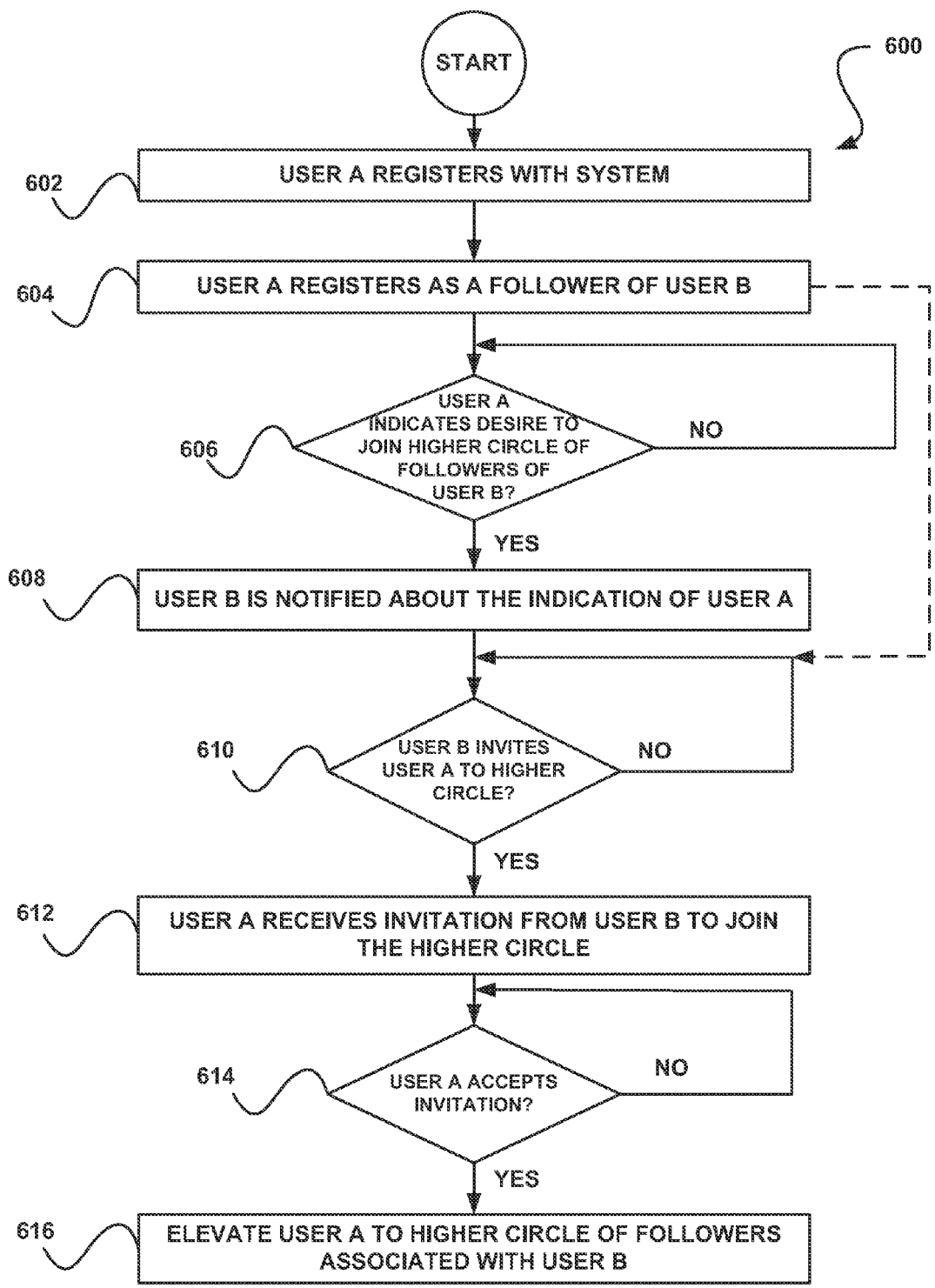
FIG. 6 shows a method for elevating a follower from a lowest circle of followers to a highest circle of followers, in accordance with still yet another embodiment.

FIG. 6 shows a method 600 for elevating a follower from a lowest circle of followers to a highest circle of followers, in accordance with still yet another embodiment. As an option, the method 600 may be carried out in the context of the architecture and environment of FIGS. 1-5. Of course, however, the method 600 may be carried out in any desired environment. Yet again, it should be noted that the aforementioned definitions may apply during the present description.

As shown in operation 602, participant A is registered with a system. Such system may include a social networking system that provides a social network, with respect to the present embodiment. Also in the context of the present embodiment, participant A may include any participant of the social networking system. Thus, registering participant A may include creating a social networking account for participant A.

In one embodiment, participant A may be registered in response to a request by the participant for a social networking account. In another embodiment, participant A may be registered utilizing information input by participant A. For example, the information may be input to a form provided on a web page of the social network. Such information may include a username of participant A, a password of participant A, an age of participant A, a geographical location of participant A and/or any other information associated with participant A.

Additionally, participant A registers as a follower of participant B, as shown in operation 604. Participant B may include another participant registered with the social networking system, in one embodiment. In another embodiment, participant B may include a content provider (e.g. may provide content via the social networking system). With respect to the present embodiment, participant A may automatically join a lowest circle of followers associated with participant B in response to the registration of participant A. Of course, while not shown, it should be noted that participant A may join the lowest circle of followers associated with participant B in response to any initiative of participant A.

The lowest circle of followers may include a default circle to which followers of participant B may be initially added. In one embodiment, participant A may join the lowest circle of followers in response to issuing a request to be added to such lowest circle. In another embodiment, participant A may join the lowest circle in response to an invitation received from participant B to join such lowest circle.

In another embodiment, participant A may select an option to join the lowest circle of followers associated with participant B. Such option may be provided to participant A via a GUI of a web page associated with a website of the social network. As an option, the web page may be associated with the social networking account of participant B. Accordingly, participant A may optionally become a follower of participant B upon registering as a follower of participant B.

Further, as shown in decision 606, it is determined whether participant A indicates a desire to join a higher circle of followers of participant B. Note decision 606. For example, participant A may select an option to join the higher circle of followers of participant B. The higher circle of followers may include any circle of followers with greater access, opportunities, etc. then that already possessed by participant A. To this end, participant A may be allowed to indicate a desire to join a higher circle of followers associated with participant B.

Once it is determined that participant A has indicated a desire to join a higher circle of followers of participant B, participant B is notified of such indication. Note operation 608. In one embodiment, participant B may be notified by sending a message to participant B. For example, the message may be sent to participant B utilizing a web page associated with the social networking account of participant B.

Furthermore, as shown in decision 610, it is determined whether participant B has invited participant A to a higher circle of followers of participant B. In the context of the present embodiment, the invitation may include any invitation to join a circle of followers associated with participant B that is higher than the lowest circle of followers that participant A joined upon registering with participant B. For example, the invitation may be to join a circle of followers next highest with respect to the lowest circle of followers, a highest circle of followers, etc.

Optionally, the invitation may include criteria required to be met by participant A prior to participant A being eligible to join the circle of followers to which participant A is invited. In one embodiment, the criteria may include an activity required to be performed by participant A (e.g. providing feedback on content provided by participant B to the follower, etc.). In another embodiment, the criteria may include a payment required to be paid by participant A.

As an option, the invitation may be sent from participant B via a GUI of a web page associated with the website of the social network. As an option, the web page may be associated with an account of participant B (e.g. customized to the account of participant B, etc.), or participant A. Further, participant B may send the invitation to participant A by identifying (e.g. selecting, inputting, etc.) an identifier (e.g. name, electronic mail address, etc.) of participant A from a list of followers and further selecting an option to send an invite to participant A.

Of course, it should be noted that as another option, participant B may invite participant A to a higher circle of followers without participant A indicating any such desire and/or without participant B being notified of such desire. For example, participant B may simply desire to invite participant A to a higher circle of followers.

If it is determined that an invitation has not been sent from participant B to participant A, the method 600 continues to wait for an invitation to be sent from participant B to participant A. If, however, it is determined that an invitation has been sent from participant B to participant A, participant A receives the invitation to join the higher circle of followers from participant B. Note operation 612. As an option, participant A may receive the invitation via the web page associated with the account of participant A. For example, the invitation may be received via a message.

It is further determined whether the invitation has been accepted by participant A, as shown in decision 614. In one embodiment, participant A may accept the invitation by selecting an accept option provided in the invitation. Of course, participant A may also decline the invitation by selecting a decline option provided in the invitation, as another option. Still yet, participant A may accept the invite by meeting any criteria required by participant B.

If it is determined that the invitation has not been accepted by participant A, the method 600 waits for participant A to take action. If, however, it is determined that the invite has been accepted by participant A, participant A is elevated to a higher circle of followers associated with participant B to which participant A was invited. Note operation 616. For example, participant A may be added to the higher circle of followers.

Figure 7:
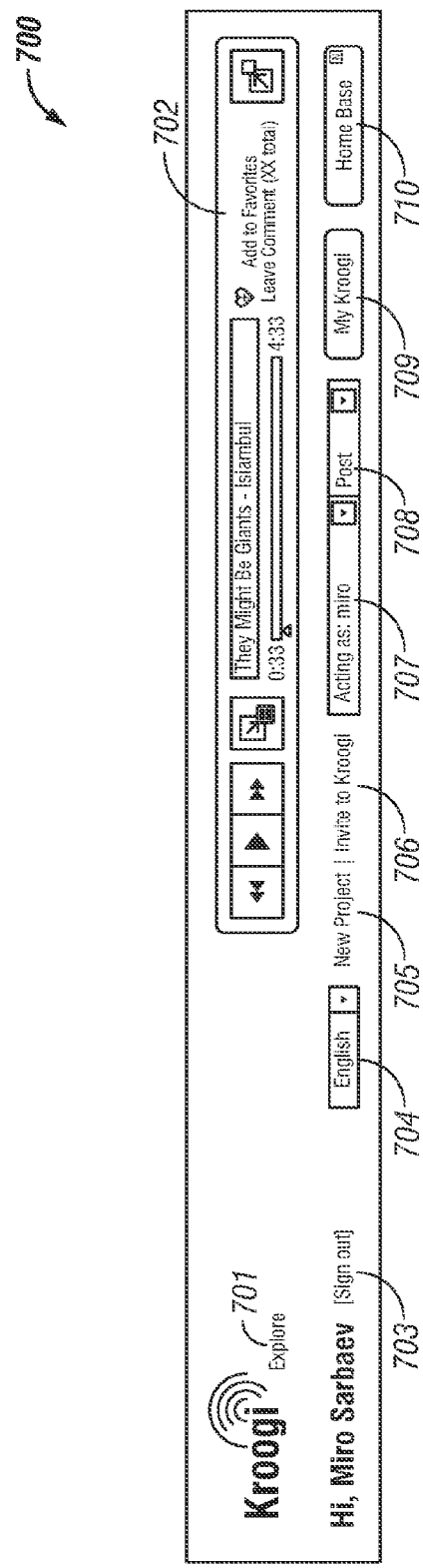
FIG. 7 shows a graphical user interface (GUI) for presenting a web page header, in accordance with another embodiment.

FIG. 7 shows a graphical user interface (GUI) 700 for presenting a web page header, in accordance with another embodiment. As an option, the GUI 700 may be implemented in the context of the architecture and environment of FIGS. 1-6. Of course, however, the GUI 700 may implemented in any desired environment. Again, it should be noted that the aforementioned definitions may apply during the present description.

As shown, the GUI 700 includes a header (e.g. of a web page, etc.). As an option, the header may not necessarily change when a participant navigates between web pages of a social network (e.g. web pages associated with a social network account of the user, etc.). The header includes a link to an "Explore" page 701 (e.g. web page) which allows the participant to become familiar with newly registered social network participants, communities of social network participants, content provided via the social network, etc. The link to the "Explore" page 701 may also allow the participant to search for content and other users of interest.

The header also includes a media player 702. In one embodiment, the media player may be utilized for streaming media content from the social network. Additionally, the header also indicates a name of the participant (e.g. which is signed in), and allows the participant to sign out via a sign out option 703. Further, the header includes a language option 704 which allows the participant to change a language of web pages of the social network presented to the participant.

Moreover, the header includes a project option 705 which may allow the participant to start new collaborative projects. For example, the projects may each include a web page capable of providing content and having as associated set of circles of followers. The header may include an invite option 706 which may allow the participant to invite new participants to the social network.

Still yet, the header includes a change option 707 for allowing the participant to change between acting on behalf of himself and on behalf of projects associated with the participant. The header also includes shortcuts 708 to web pages for posting (e.g. uploading, etc.) new content, a main page link 709 which allows the participant to view and modify a main web page that presents an account of the participant (e.g. a project of the participant, content of the participant, etc.) to other participants and/or viewers of the main page, and a dashboard link 710 which allows the participant to access a private dashboard containing statistics about the account of the participant and/or a summary of new content viewed by the other participants.

Figure 8:
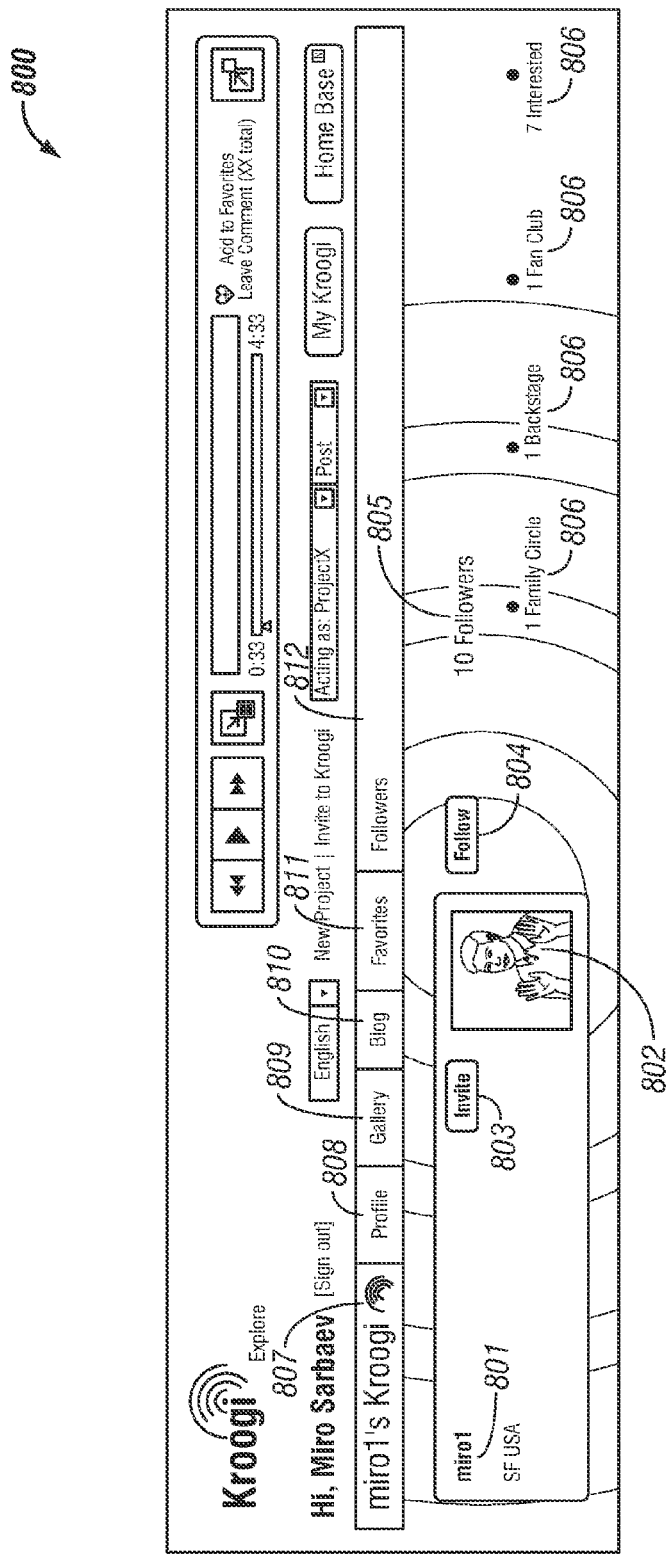
FIG. 8 shows a GUI for presenting a participant-related header to a web page of a social network, in accordance with yet another embodiment.

FIG. 8 shows a GUI 800 for presenting a participant-related header to a web page of a social network, in accordance with yet another embodiment. As an option, the GUI 800 may be implemented in the context of the architecture and environment of FIGS. 1-7. Of course, however, the GUI 800 may be implemented in any desired environment. Again, it should be noted that the aforementioned definitions may apply during the present description.

As shown, the GUI 800 includes a participant-related header to a web page of a social network. For example, the header may be configured for the participant. For example, when a participant views a web page associated with an account of the participant, a header specific to the participant may be displayed on such web page.

The header may include information about the participant, options for navigating within web pages associated with an account of the participant, data about a status of the participant in the social network, etc. As shown, the header displays a name of the participant in addition to other participant data 801, an avatar of the participant 802, controls to invite other participants to a circle of followers associated with the participant 803, an option to join a circle of followers associated with another participant 804, etc. The header also displays a total number of participants who are followers of the participant 805, in addition to a total number of followers of the participant per circle of followers associated with the participant 806. Still yet, the header includes a navigation bar for allowing the participant to access a main web page associated with the participant 807, a detailed profile of the participant 808, a gallery of content provided by the participant 809, a web log (blog) of the participant 810, a list of favorite entries of the participant 811, and detailed information about followers and circles of followers of the participant 812.

Figure 9:
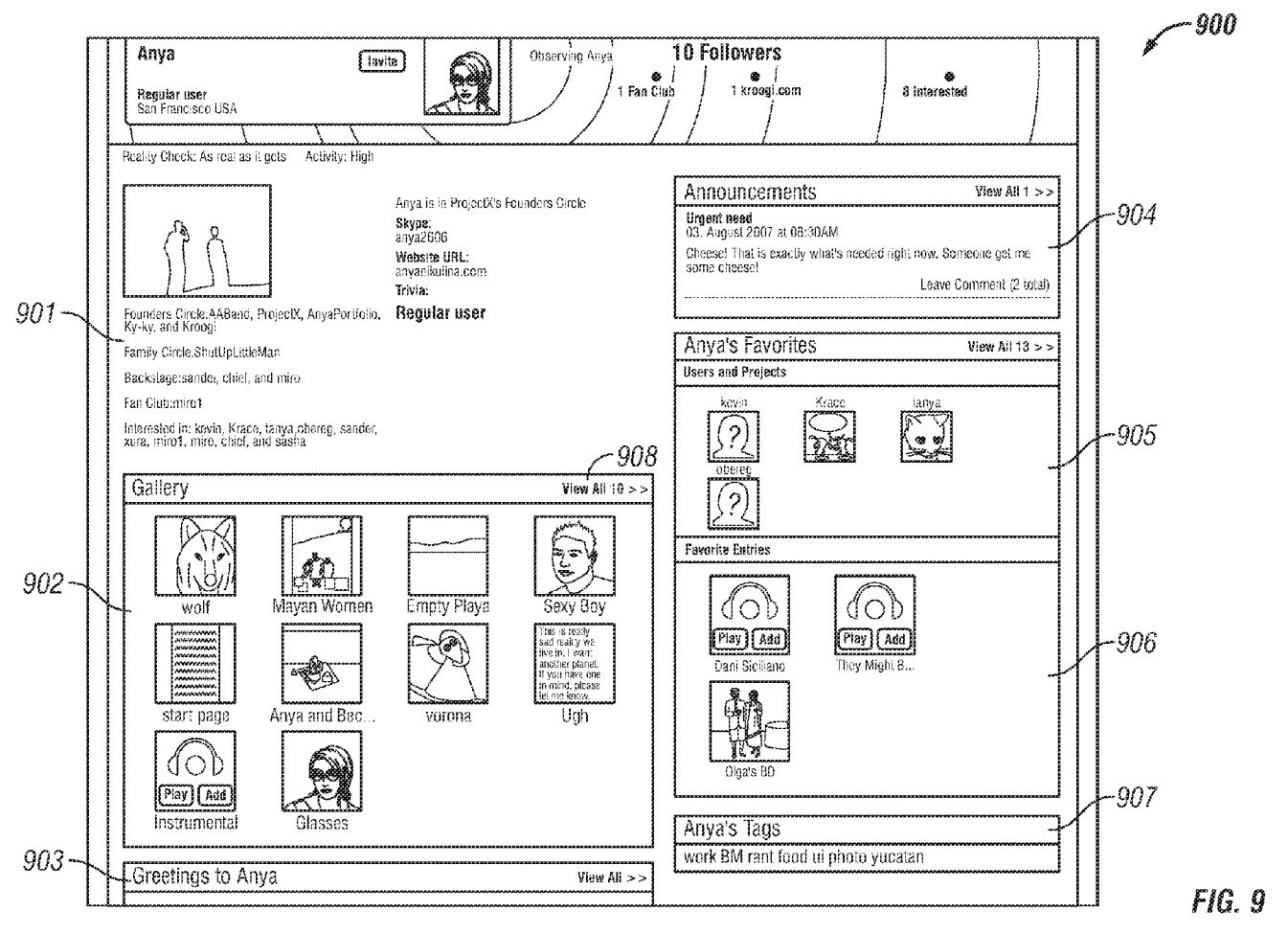

FIG. 9 shows a GUI 900 for presenting a main web page associated with a participant, in accordance with still yet another embodiment. As an option, the GUI 900 may be implemented in the context of the architecture and environment of FIGS. 1-8. For example, the GUI 900 may be displayed in response to selection of the option to navigate to the main web page associated with the participant 807 of FIG. 8. Of course, however, the GUI 900 may be implemented in any desired environment. Again, it should be noted that the aforementioned definitions may apply during the present description.

As shown, the GUI 900 may present a main web page associated with a participant. For example, the main web page may be associated with a social network account of the participant. As an option, the main web page may be accessible via the navigation option 807 presented on the participant-related header of FIG. 8.

The main web page displays information associated with the participant in addition to a picture associated with the participant 901, highlights from a gallery of content provided by the participant 902, greetings (e.g. comments, etc.) from visitors of the main web page 903, and an option to post a new greeting and/or announcements by participant 904. Additionally, the main web page may display highlights associated with favorite content of the participant (e.g. selected as a favorite by the user, etc.) 906, participants and projects 905, tags associated with the participant (e.g. describing the participant, etc.) 907, and an activity history of the participant 908.

Figure 10:
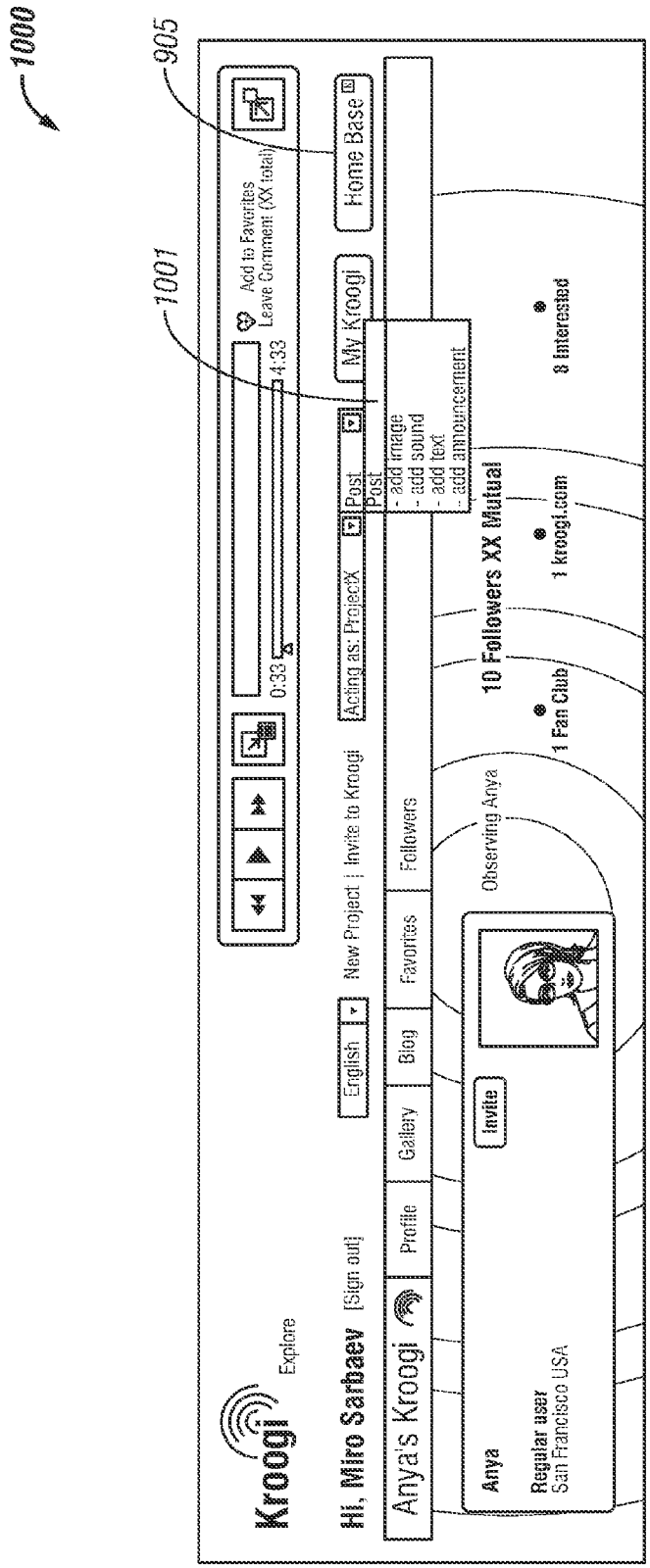
FIG. 10 shows a GUI for allowing a participant to navigate to a web page for adding content to a social network, in accordance with another embodiment.

FIG. 10 shows a GUI 1000 for allowing a participant to navigate to a web page for adding content to a social network, in accordance with another embodiment. As an option, the GUI 1000 may be implemented in the context of the architecture and environment of FIGS. 1-9. Of course, however, the GUI 1000 may be implemented in any desired environment. Again, it should be noted that the aforementioned definitions may apply during the present description.

The GUI 1000 may present a drop down menu of different types of content capable of being added to a project of the participant. By selecting the "post" option 1001 from the drop down menu, the participant may navigate to a plurality of different web pages capable of being utilized for posting (e.g. uploading) different types of content. For example, each web page may be utilized for posting a particular type of content.

Figure 11:
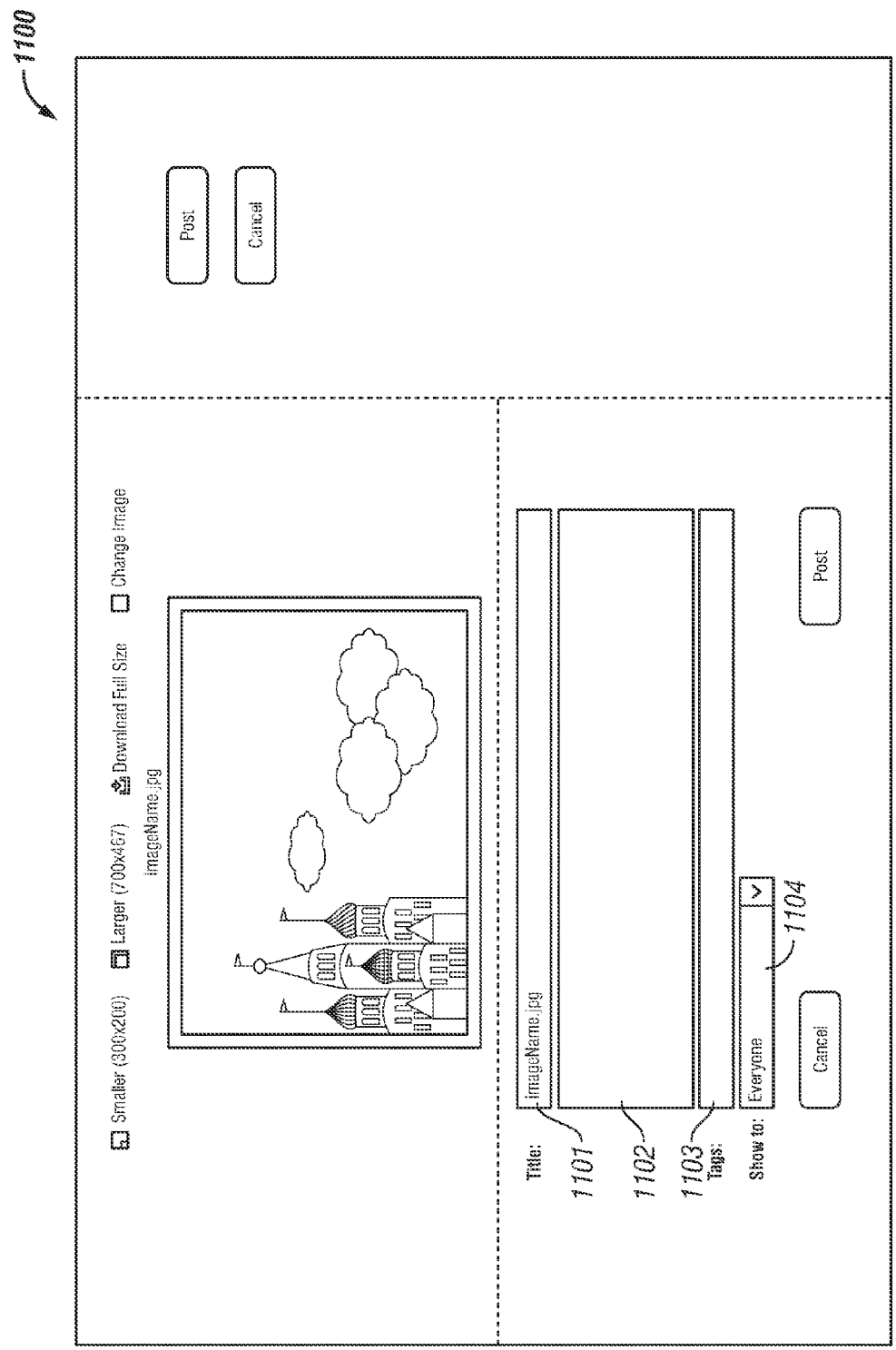
FIG. 11 shows a GUI for allowing a participant to add content to a social network, in accordance with another embodiment.

FIG. 11 shows a GUI 1100 for allowing a participant to add content to a social network, in accordance with another embodiment. As an option, the GUI 1100 may be implemented in the context of the architecture and environment of FIGS. 1-10. Of course, however, the GUI 1100 may be implemented in any desired environment. Again, it should be noted that the aforementioned definitions may apply during the present description.

A participant may utilize the GUI 1100 for uploading content (e.g. files including content, etc.). The content may include music, pictures, other media, texts, etc. The GUI 1100 may also allow the participant to attribute the content. For example, with respect to the uploading of an image (as shown), a participant may add a title 1101, description 1102, and tags 1103 for the image. The participant may also setup security attributes 1104, such as which followers of the participant can access the image. Just by way of example, the participant may setup the security attributes such that all participants may access the image, only participants watched by the participant may access the image, only followers included in particular circles of the participant may access the image, etc.

Figure 12:
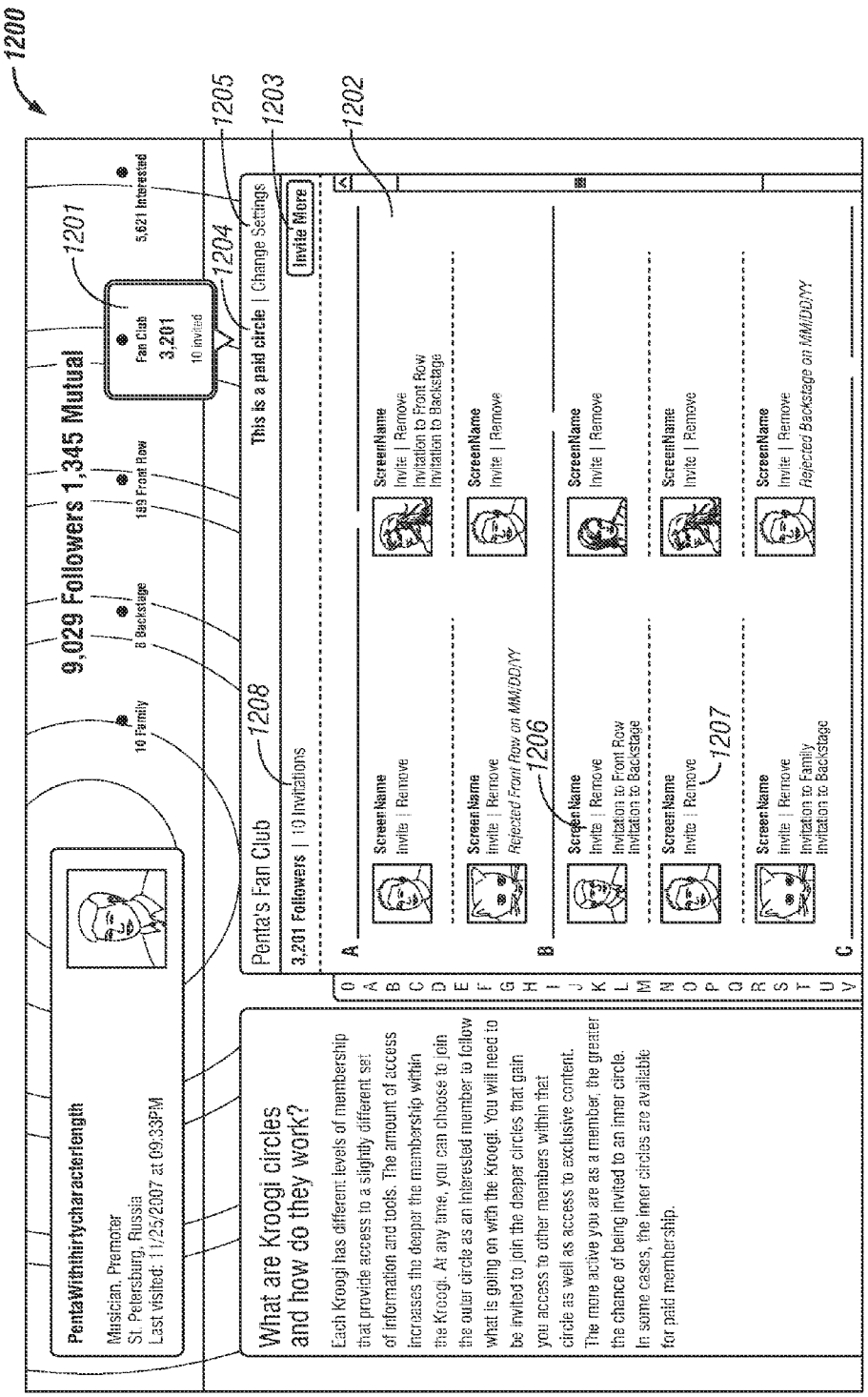
FIG. 12 shows a GUI for presenting circles of followers, in accordance with yet another embodiment.

FIG. 12 shows a GUI 1200 for presenting circles of followers, in accordance with yet another embodiment. As an option, the GUI 1200 may be implemented in the context of the architecture and environment of FIGS. 1-11. For example, the GUI 1200 may be presented in response to selection of the followers tab 812 of FIG. 8. Of course, however, the GUI 1200 may be implemented in any desired environment. Again, it should be noted that the aforementioned definitions may apply during the present description.

The GUI 1200 may allow a participant to manage circles of followers of the participant and/or to view details of circles of followers of another participant. As an option, the participant may view the GUI 1200 by selecting the "followers" tab 812 of FIG. 8. The GUI 1200 may allow a participant to select a particular circle of followers 1201, view participants who are members of the selected circle 1202, invite additional participants to the selected circle 1203, determine whether the selected circle is a paid circle 1204, change settings for the selected circle 1205, invite followers of the selected circle to closer (e.g. higher) circles of the participant 1206, and remove followers from the selected circle 1207. Additionally, the GUI 1200 may allow the participant to view outstanding invitations (e.g. invitations not yet accepted) to the selected circle 1208.

Figure 13:
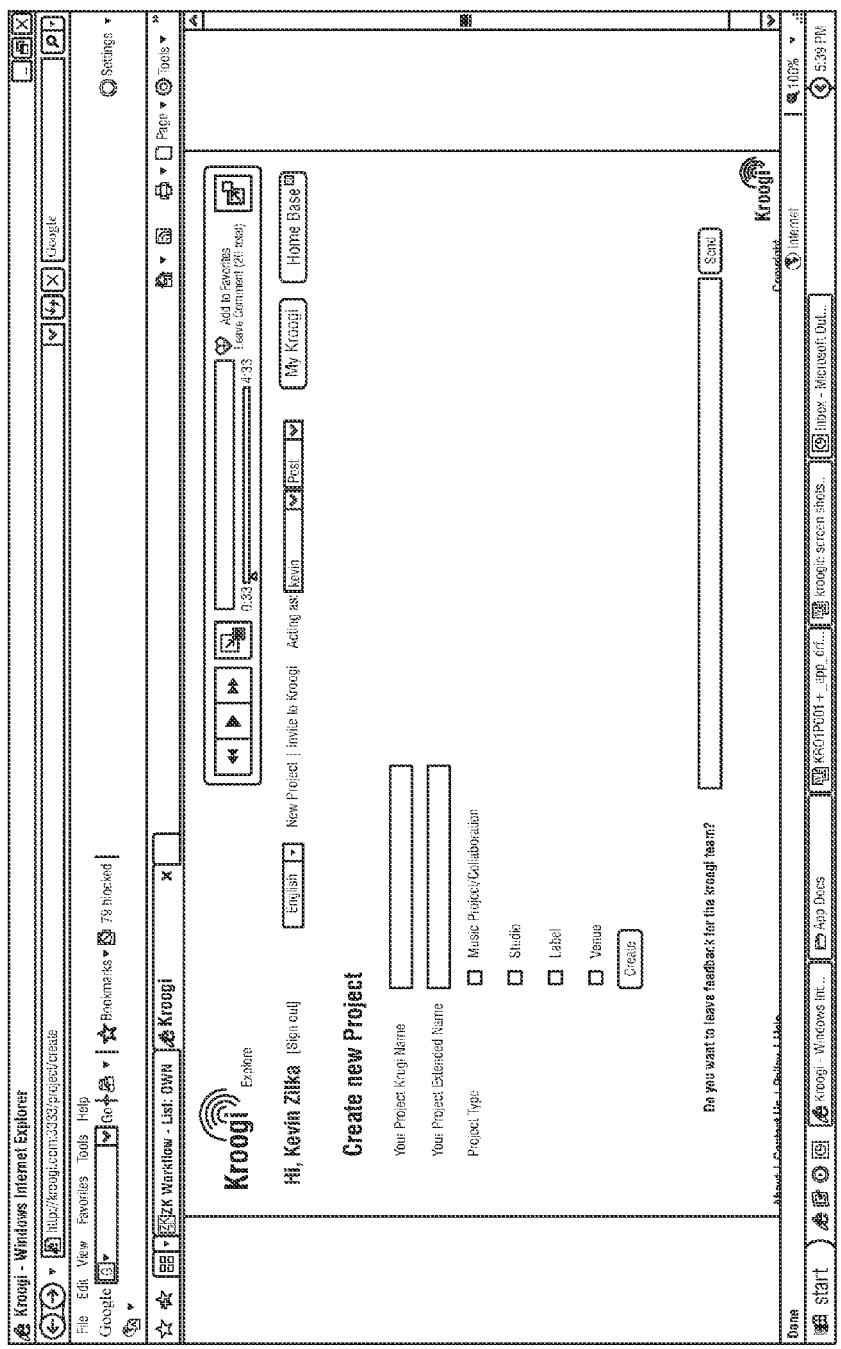
FIG. 13 shows a GUI for allowing a participant to create a new project for providing content via a social network, in accordance with another embodiment.

FIG. 13 shows a GUI 1300 for allowing a participant to create a new project for providing content via a social network, in accordance with another embodiment. As an option, the GUI 1300 may be implemented in the context of the architecture and environment of FIGS. 1-12. Of course, however, the GUI 1300 may be implemented in any desired environment. Again, it should be noted that the aforementioned definitions may apply during the present description.

The GUI 1300 may allow the participant to create a new project. For example, the project may include a web page providing content that is capable of being viewed by other participants (e.g. followers of the participant). The GUI 1300 may allow the participant to input a project name, a project type (e.g. a type of content provided via the web page), etc. The GUI 1100 may also optionally allow the participant to invite other participants of the social network to participate in the project as a content provider group.

Figure 14:
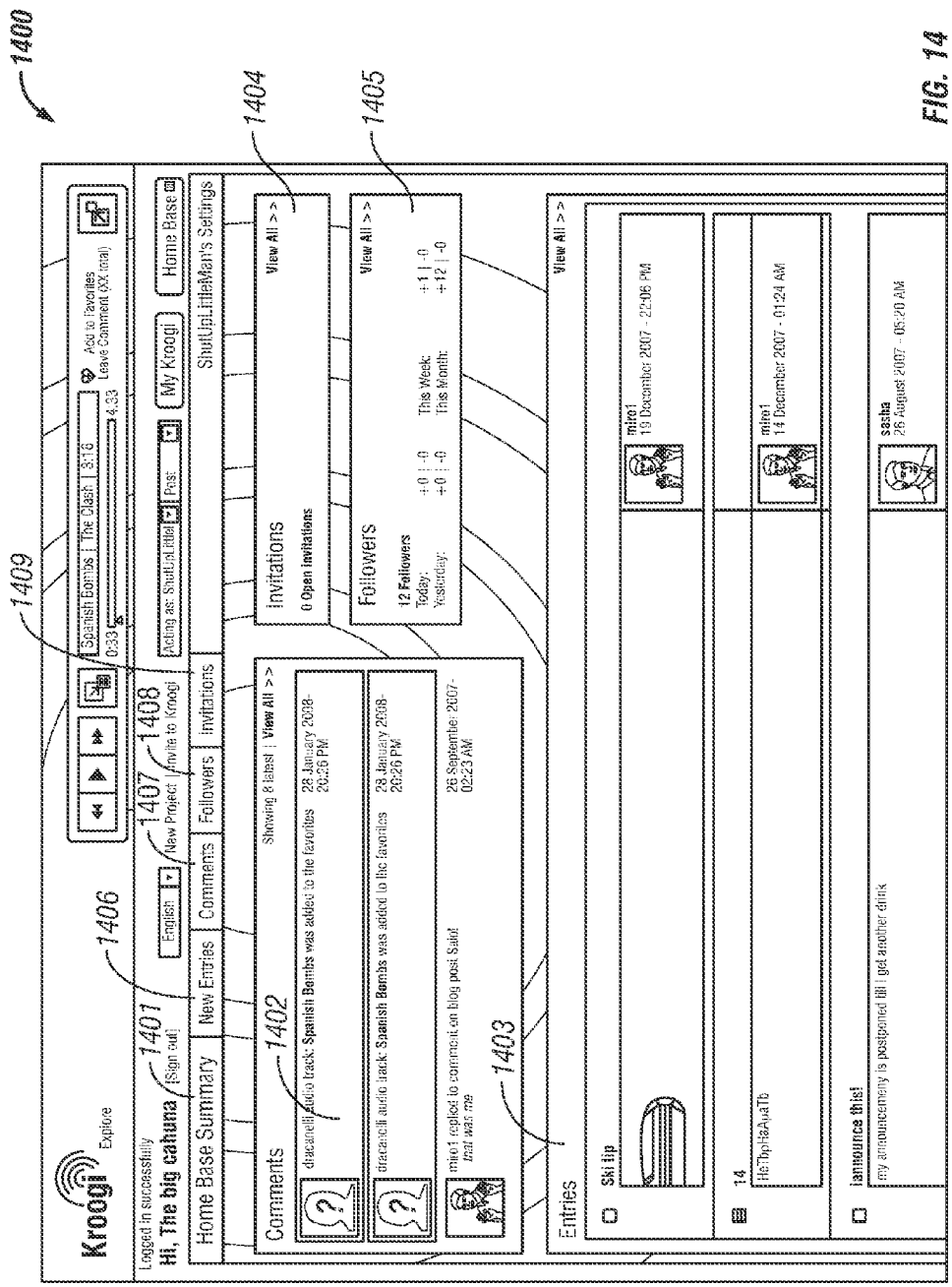
FIG. 14 shows a GUI for presenting a dashboard showing different aspects of a social network, in accordance with another embodiment.

FIG. 14 shows a GUI 1400 for presenting a dashboard showing different aspects of a social network, in accordance with another embodiment. As an option, the GUI 1400 may be implemented in the context of the architecture and environment of FIGS. 1-13. For example, the GUI 1400 may be presented in response to selection of dashboard link 710 of FIG. 7. Of course, however, the GUI 1400 may be implemented in any desired environment. Again, it should be noted that the aforementioned definitions may apply during the present description.

The GUI 1400 presents a dashboard showing different aspects of a social network, which may be relevant to a particular participant. The GUI 1400 displays recent comments 1402 (e.g. regarding content of a participant, a comment of the participant, a comment of another participant, etc.). The GUI 1400 also displays recent entries that are posted by other participants that are of interest to the participant associated with the dashboard 1403.

Additionally, the GUI 1400 displays recent invitations received by the participant to circles of followers of other participants 1404, and changes in followers associated with the participant 1405. The user may drill down via the GUI 1400 and view all followed content entries in chronological order 1406, all comments 1407 (e.g. a subset of which may be displayed chronologically in area 1402), all changes in followers 1408, and all invitations 1409. Participant can view a summary page from any of the drill-down options by clicking on tab 1401.

FIG. 15 shows a GUI 1500 for modifying settings for paid circles of a participant, in accordance with another embodiment. As an option, the GUI 1500 may be implemented in the context of the architecture and environment of FIGS. 1-14. For example, the GUI 1500 may be presented in response to selection of the option to change settings for a selected circle 1205 of FIG. 12. Of course, however, the GUI 1500 may be implemented in any desired environment. Again, it should be noted that the aforementioned definitions may apply during the present description.

The GUI 1500 may allow a participant to change a fee (e.g. a membership price) for a circle of followers of the participant 1501. For example, the participant may set fees for different circles of followers of the participant. Thus, followers may only be included in one of such circles upon payment of the associated fee. The GUI 1500 may also optionally allow the participant to select which of the circles of followers requires payment by followers for such followers to be included 1502.

Figure 16:
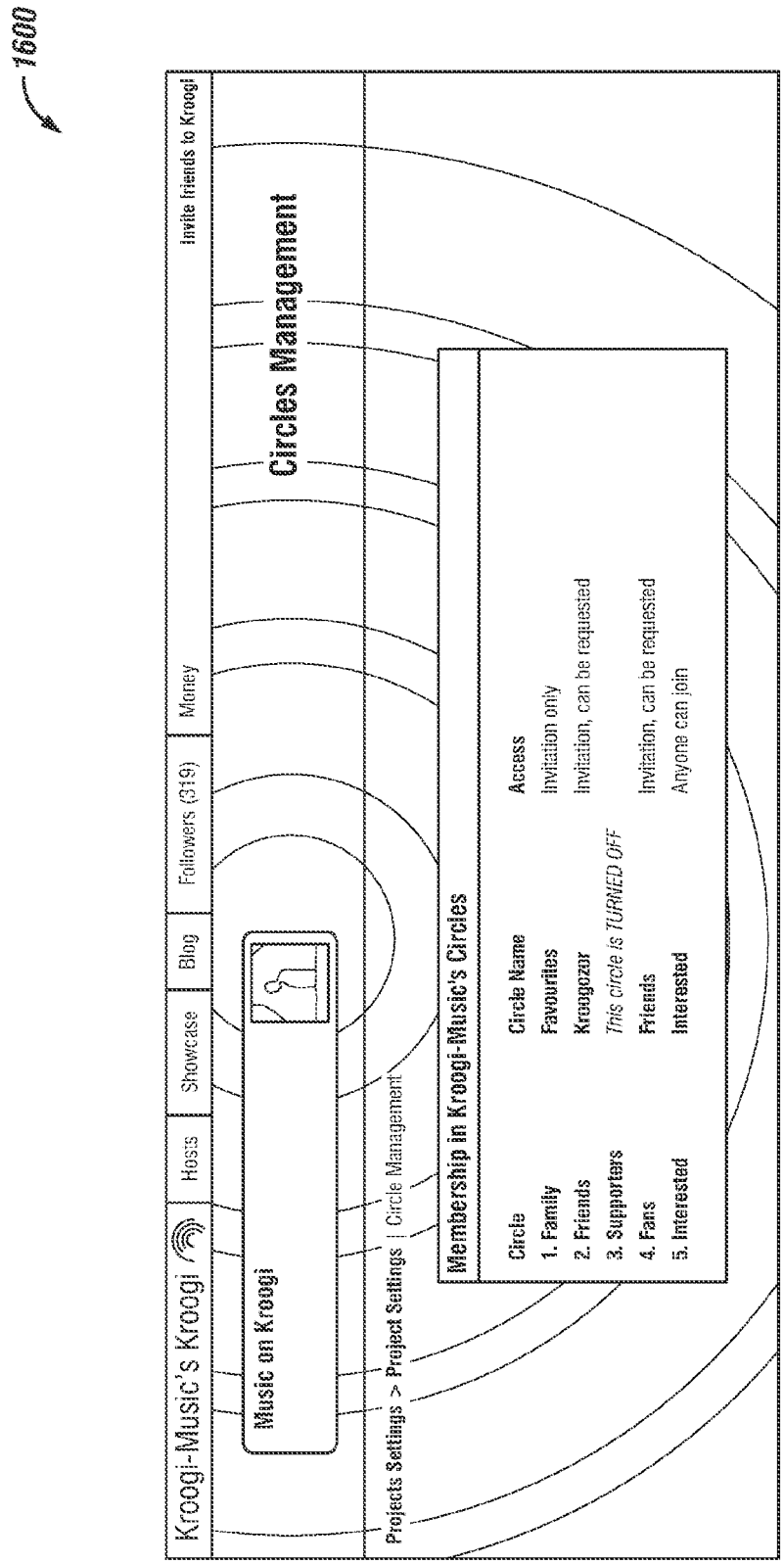
FIG. 16 shows a GUI for modifying settings for accessibility of circles of a participant, in accordance with another embodiment.

FIG. 16 shows a GUI 1600 for modifying settings for accessibility of circles of a participant, in accordance with another embodiment. As an option, the GUI 1600 may be implemented in the context of the architecture and environment of FIGS. 1-15. Of course, however, the GUI 1600 may be implemented in any desired environment. Again, it should be noted that the aforementioned definitions may apply during the present description.

As shown, each of a plurality of circles of followers (e.g. family circle, friends circle, etc.) associated with a participant are displayed via the GUI 1600. In addition, a name for each of the circles of followers (e.g. as configured by the participant) is also displayed via the GUI 1600. In one embodiment, the GUI 1600 may be utilized by the participant for modifying a name of each of the circles.

Further, a type of access associated with each of the circle is displayed via the GUI 1600. The type of access may indicate an action required to be performed by a participant in order for the participant to become a follower included in the associated circle. For example, the types of access may include invitation only (e.g. invitation initiated by the participant associated with, providing, owning, etc. the circles), invitation by request (e.g. invitation requested by the participant desiring to be included as a follower in the associated circle), no requirement (no requirement to become a follower), etc. In another embodiment, the GUI 1600 may be utilized by the participant associated with the circles for modifying the type of access associated with each of the circles. Moreover, the GUI 1600 may optionally be utilized for enabling/disabling each of the circles, where participants may not necessarily be included as followers of a disabled circle.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:

computer code for storing information associated with participants of a social network that are associated with a person of the social network, the computer program product being operable such that a plurality of groups of participants are capable of being defined by the person and each group is capable of including participants of a different level of closeness to the person;

computer code for receiving input in association with content;

computer code for receiving an attribute for the content from the person, the attribute causing only participants of a selected at least one of the groups of participants being allowed access to the content;

computer code for allowing access to the content by the participants of the selected at least one of the groups of participants, the computer program product being operable such that each group is capable of being associated with different content, such that for each group, participants included in each group are capable of being allowed access to different content than participants included in another group;

computer code for displaying to the person a first one of a plurality of web pages associated with an account of the person of the social network, the first web page graphically representing at least some of the groups of participants of the different level of closeness to the person utilizing a plurality of circles displayed on the first web page, each displayed circle representing a different one of the groups of the participants;

computer code for receiving a selection from the person of one of the displayed circles via the first web page;

computer code for displaying to the person the participants included in the group represented by the selected circle; and computer code for presenting at least one option to the person for modifying at least one setting associated with the selected circle;

wherein the computer program product is operable such that access to at least one of the groups is capable of being determined by the person to include at least one of a plurality of access types comprising: an invitation only access such that access is provided only by an invitation initiated by the person, an invitation by request access such that the access is provided by the person in response to an invitation request from at least one of the participants, and another access such that the access is provided in response to a request from at least one of the participants.

2. The computer program product as set forth in claim 1, wherein the computer program product is operable such that the at least one group includes a following group.

3. The computer program product as set forth in claim 1, wherein the computer program product is operable such that access to at least one of the groups represented by one of the circles is capable of being provided by the person in response to an invitation request from at least one of the participants.

4. The computer program product as set forth in claim 1, wherein the computer program product is operable such that the groups are capable of including a family group, a friend group, and a following group.

5. The computer program product as set forth in claim 1, wherein the computer program product is operable such that, in response to a selection of at least of the participants of one of the groups represented by one of the circles, the at least one participant is capable of being added to a different group represented by a different circle.

6. The computer program product as set forth in claim 1, and further comprising computer code for receiving a selection of an explore option, and in response to the selection:

displaying communities of participants;

displaying additional content provided via the social network; and allowing a search for other content and other participants.

7. The computer program product as set forth in claim 1, and further comprising computer code for displaying, with each circle, a number of the participants in an associated group.

8. The computer program product as set forth in claim 1, and further comprising computer code for displaying a header specific to the person that remains constant while the person navigates the web pages associated with the account of the person of the social network.

9. The computer program product as set forth in claim 1, and further comprising computer code for displaying a header specific to the person that remains constant while the person navigates the web pages associated with the account of the person of the social network, the header including access to a main web page, access to a profile of the person, access to a gallery of content, access to a log, and access to detailed information associated with one or more of the participants.

10. The computer program product as set forth in claim 1, wherein the computer program product is operable such that at least one language preference of the person is identified including a first language and a second language, and content is displayed to the person in the first language or the second language, based on availability.

11. The computer program product as set forth in claim 1, and further comprising:
    computer code for determining whether certain content is available in a first language preferred by the person;
    computer code for, if it is determined that the certain content is available in the first language, displaying the certain content to the person in the first language;
    computer code for, if it is determined that the certain content is not available in the first language, it is determined whether the certain content is available in a second language preferred by the person; and
    computer code for, if it is determined that the certain content is available in the second language, displaying the certain content to the person in the second language.

12. The computer program product as set forth in claim 1, and further comprising:
    computer code for determining whether certain content is available in a first language preferred by the person;
    computer code for, if it is determined that the certain content is available in the first language, displaying the certain content to the person in the first language;
    computer code for, if it is determined that the certain content is not available in the first language, it is determined whether the certain content is available in a second language preferred by the person;
    computer code for, if it is determined that the certain content is available in the second language, displaying the certain content to the person in the second language; and
    computer code for, if it is determined that the certain content is not available in the second language, displaying the certain content to the person in another language.

13. The computer program product as set forth in claim 1, and further comprising:
    computer code for creating an event with one or more of the circles associated therewith.

14. The computer program product as set forth in claim 13, wherein the computer program product is operable such that the event includes a project, and is associated with a place.

15. The computer program product as set forth in claim 1, and further comprising:

computer code for displaying a second web page for creating an event;

computer code for receiving an event name from the person for being associated with the event;

computer code for receiving a selection of an event type from the person for being associated with the event;

computer code for receiving a selection of event-related content from the person for being associated with the event; and computer code for allowing the person to permit participants associated with the event to provide additional event-related content for being associated with the event.

16. The computer program product as set forth in claim 1, wherein the computer program product is operable such that:
    the information includes at least one of a username, a password, an age, a geographical location, or additional information;
    the defining includes at least one of inviting, providing a new name, providing criteria, or indicating access rights;
    the participants include followers;
    the different level of closeness includes a hierarchical relationship;
    the selection of content includes at least one of posting or uploading content;
    the circles include concentric circles; and
    the input in association with the content includes a selection of the content.

17. A method, comprising:
    storing information associated with participants of a social network that are associated with a person of the social network, where a plurality of groups of participants are capable of being defined by the person and each group is capable of including participants of a different level of closeness to the person, utilizing at least one server;
    receiving input in association with content, utilizing the at least one server;
    receiving an attribute for the content, the attribute resulting in only participants of a selected at least one of the groups of participants being allowed access to the content, utilizing the at least one server;
    allowing access to the content by the participants of the selected at least one of the groups of participants, where each group is capable of being associated with different content, such that for each group, participants included in each group are capable of being allowed access to different content than participants included in another group, utilizing the at least one server;
    displaying to the person a first one of a plurality of web pages associated with an account of the person of the social network, the first web page graphically representing at least some of the groups of participants of the different level of closeness to the person utilizing a plurality of circles displayed on the first web page, each displayed circle representing a different one of the groups of the participants, utilizing the at least one server;
    receiving a selection from the person of one of the displayed circles via the first web page, utilizing the at least one server;
    displaying to the person the participants included in the group represented by the selected circle, utilizing the at least one server; and
    presenting at least one option to the person for modifying at least one setting associated with the selected circle, utilizing the at least one server;

wherein, in response to a selection of at least of the participants of one of the groups represented by one of the circles, the at least one participant is capable of being added to a different group represented by a different circle;

wherein access to at least one of the groups is capable of being determined by the person to include at least one of a plurality of access types comprising: an invitation only access such that access is provided only by an invitation initiated by the person, an invitation by request access such that the access is provided by the person in response to an invitation request from at least one of the participants, and another access such that the access is provided in response to a request from at least one of the participants.

18. The method as set forth in claim 17, wherein access to at least one of the groups represented by one of the circles is capable of being provided by the person in response to an invitation request from at least one of the participants.

19. The method as set forth in claim 17, wherein the groups are capable of including a family group, a friend group, and a following group.

20. The method as set forth in claim 17, wherein access to at least one of the groups is capable of being determined by the person to include at least one of the plurality of access types comprising the another access such that the access is provided in response to a request from at least one of the participants.

21. The method as set forth in claim 17, and further comprising receiving a selection of an explore option, and in response to the selection:
displaying communities of participants;
displaying additional content provided via the social network; and
allowing a search for other content and other participants.

22. The method as set forth in claim 17, and further comprising displaying, with each circle, a number of the participants in an associated group.

23. The method as set forth in claim 17, and further comprising displaying a header specific to the person that remains constant while the person navigates the web pages associated with the account of the person of the social network.

24. The method as set forth in claim 17, and further comprising displaying a header specific to the person that remains constant while the person navigates the web pages associated with the account of the person of the social network, the header including access to a main web page, access to a profile of the person, access to a gallery of content, access to a log, and access to detailed information associated with one or more of the participants.

25. The method as set forth in claim 17, wherein at least one language preference of the person is identified including a first language and a second language, and content is displayed to the person in the first language or the second language, based on availability.

26. The method as set forth in claim 17, and further comprising:
determining whether certain content is available in a first language preferred by the person;
if it is determined that the certain content is available in the first language, displaying the certain content to the person in the first language;
if it is determined that the certain content is not available in the first language, it is determined whether the certain content is available in a second language preferred by the person; and
if it is determined that the certain content is available in the second language, displaying the certain content to the person in the second language.

27. The method as set forth in claim 17, and further comprising creating an event with one or more of the circles associated therewith.

\* \* \* \* \*